United States Patent
Fukao

(10) Patent No.: US 9,937,977 B2
(45) Date of Patent: Apr. 10, 2018

(54) BICYCLE OPERATING SYSTEM, TAKE-UP DEVICE, AND BICYCLE OPERATING APPARATUS

(71) Applicant: SHIMANO INC., Sakai (JP)

(72) Inventor: Kazutaka Fukao, Sakai (JP)

(73) Assignee: SHIMANO INC., Sakai (JP)

( * ) Notice: Subject to any disclaimer, the term of this patent is extended or adjusted under 35 U.S.C. 154(b) by 180 days.

(21) Appl. No.: 14/583,176

(22) Filed: Dec. 25, 2014

(65) Prior Publication Data
US 2015/0291247 A1    Oct. 15, 2015

Related U.S. Application Data

(63) Continuation-in-part of application No. 14/249,305, filed on Apr. 9, 2014, now abandoned.

(51) Int. Cl.
  *B62K 23/02* (2006.01)
  *B62L 3/02* (2006.01)
  *B62K 23/06* (2006.01)

(52) U.S. Cl.
  CPC ............. *B62K 23/06* (2013.01); *B62L 3/023* (2013.01)

(58) Field of Classification Search
  CPC  B62K 23/02; B62K 23/06; B62L 3/02; B62L 3/023; B60T 11/046; B62M 25/04; B62M 25/045; Y10T 74/20438
  See application file for complete search history.

(56) References Cited

U.S. PATENT DOCUMENTS

| | | |
|---|---|---|
| 3,901,095 A | 8/1975 | Wechsler |
| 3,972,247 A | 8/1976 | Armstrong |
| 5,894,759 A | 4/1999 | Nakamura |
| 5,941,125 A | 8/1999 | Watarai et al. |
| 6,149,541 A | 11/2000 | Nakamura et al. |
| 6,305,237 B1 | 10/2001 | Ichida |
| 6,453,766 B1 | 9/2002 | Ose |
| 7,032,475 B2 | 4/2006 | Ichida et al. |
| 7,204,169 B2 * | 4/2007 | Mitchell ............... B62K 23/04 74/489 |
| 7,219,574 B2 | 5/2007 | Ichida et al. |
| 7,240,772 B2 * | 7/2007 | Tsai ...................... B62K 23/06 188/2 D |
| 7,249,661 B2 * | 7/2007 | Becocci ............... B60T 11/046 188/24.16 |
| 7,509,888 B2 | 3/2009 | Ichida et al. |
| 8,297,143 B2 * | 10/2012 | Fujii ..................... B62K 23/02 200/61.88 |
| 8,402,664 B1 * | 3/2013 | Kitamura .............. B62K 23/04 200/61.85 |
| 8,549,955 B2 * | 10/2013 | Sato ...................... B62K 23/06 74/488 |

(Continued)

FOREIGN PATENT DOCUMENTS

| | | | |
|---|---|---|---|
| CN | 1254665 | 5/2000 | |
| WO | WO 2007025984 A1 * | 3/2007 | ............ B62K 23/06 |

*Primary Examiner* — Adam D Rogers
(74) *Attorney, Agent, or Firm* — Mori & Ward, LLP

(57) ABSTRACT

A bicycle operating system comprises a first operating device and a take-up device. The take-up device is configured to be provided in a tubular part of a bicycle body. The take-up device is configured to move a control cable configured to be connected to a bicycle component. The take-up device is operatively coupled to the first operating device via a first control element.

42 Claims, 27 Drawing Sheets

(56) References Cited

U.S. PATENT DOCUMENTS

| | | | | |
|---|---|---|---|---|
| 8,881,619 | B2* | 11/2014 | Lim | G05G 1/04 |
| | | | | 74/502.2 |
| 9,004,245 | B2* | 4/2015 | Moore | B60T 11/16 |
| | | | | 188/2 D |
| 9,573,650 | B2* | 2/2017 | Chen | B62L 3/023 |
| 2012/0200061 | A1* | 8/2012 | D'Aluisio | B62L 3/02 |
| | | | | 280/281.1 |
| 2014/0360303 | A1* | 12/2014 | Meggiolan | B62L 3/023 |
| | | | | 74/488 |
| 2015/0090550 | A1* | 4/2015 | Matsueda | B62L 3/023 |
| | | | | 188/344 |
| 2015/0210347 | A1* | 7/2015 | Chen | B60T 17/046 |
| | | | | 188/344 |
| 2016/0052587 | A1* | 2/2016 | Fukao | B62K 23/06 |
| | | | | 74/502.2 |

\* cited by examiner

|  |  |  | FS | |
|---|---|---|---|---|
|  |  |  | 39 | 53 |
|  |  |  | LOW | TOP |
| RS | 23 | 1st | 1.70 | 2.30 |
|  | 21 | 2nd | 1.86 | 2.52 |
|  | 19 | 3rd | 2.05 | 2.79 |
|  | 17 | 4th | 2.29 | 3.12 — SS2 |
|  | 15 | 5th | 2.60 — SS1 | 3.53 |
|  | 14 | 6th | 2.79 | 3.79 |
|  | 13 | 7th | 3.00 | 4.08 |
|  | 12 | 8th | 3.25 | 4.42 |
|  | 11 | 9th | 3.55 | 4.82 |

FIG. 26

BICYCLE OPERATING SYSTEM, TAKE-UP DEVICE, AND BICYCLE OPERATING APPARATUS

CROSS-REFERENCE TO RELATED APPLICATIONS

The present application is a continuation-in-part application of the U.S. patent application Ser. No. 14/249,305 filed Apr. 9, 2014. The contents of this application are incorporated herein by reference in their entirety.

BACKGROUND OF THE INVENTION

Field of the Invention

The present invention relates to a bicycle operating system, a take-up device, and a bicycle operating apparatus.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating system for operating bicycle components.

SUMMARY OF THE INVENTION

In accordance with a first aspect of the present invention, a bicycle operating system comprises a first operating device and a take-up device. The take-up device is configured to be provided in a tubular part of a bicycle body. The take-up device is configured to move a control cable configured to be connected to a bicycle component. The take-up device is operatively coupled to the first operating device via a first control element.

In accordance with a second aspect of the present invention, the bicycle operating system according to the first aspect is configured so that the take-up device is a separate device from the first operating device.

In accordance with a third aspect of the present invention, the bicycle operating system according to the second aspect is configured so that the first operating device and the take-up device are mounted to the bicycle body independently of each other.

In accordance with a fourth aspect of the present invention, the bicycle operating system according to the first aspect further comprises the first control element via which the take-up device is operatively coupled to the first operating device.

In accordance with a fifth aspect of the present invention, the bicycle operating system according to the fourth aspect is configured so that the first control element comprises a mechanical control cable configured to transmit an operating force from the first operating device to the take-up device.

In accordance with a sixth aspect of the present invention, the bicycle operating system according to the fourth aspect is configured so that the first control element comprises a signal communication path configured to transmit a signal from the first operating device to the take-up device.

In accordance with a seventh aspect of the present invention, the bicycle operating system according to the fourth aspect is configured so that the first control element comprises a fluid configured to transmit an operating force from the first operating device to the take-up device.

In accordance with an eighth aspect of the present invention, the bicycle operating system according to the first aspect is configured so that the take-up device is configured to be operatively connected to a first transmission device via a first control cable and is configured to be operatively connected to a second transmission device via a second control cable. The take-up device is configured to control a speed stage of the first transmission device and a speed stage of the second transmission device in response to a first operation of the first operating device.

In accordance with a ninth aspect of the present invention, the bicycle operating system according to the eighth aspect is configured so that the take-up device includes a first take-up member and a second take-up member. The first take-up member is configured to move the first control cable. The second take-up member is configured to move the second control cable. The first take-up member and the second take-up member are configured to move independently of each other in response to the first operation of the first operating device.

In accordance with a tenth aspect of the present invention, the bicycle operating system according to the ninth aspect is configured so that the first take-up member and the second take-up member are configured to move simultaneously in response to the first operation of the first operating device.

In accordance with an eleventh aspect of the present invention, the bicycle operating system according to the eighth aspect is configured so that the first take-up member and the second take-up member are configured to be provided in the tubular part as a single unit.

In accordance with a twelfth aspect of the present invention, the bicycle operating system according to the first aspect is configured so that the tubular part comprises a stem configured to couple a handlebar to a steering column.

In accordance with a thirteenth aspect of the present invention, the bicycle operating system according to the twelfth aspect is configured so that the stem includes a first attachment portion and a second attachment portion. The first attachment portion is configured to be attached to the handlebar. The second attachment portion is configured to be attached to the steering column. The take-up device is provided between the first attachment portion and the second attachment portion.

In accordance with a fourteenth aspect of the present invention, the bicycle operating system according to the first aspect further comprises a second operating device. The take-up device is configured to be operatively coupled to the second operating device via a second control element. The take-up device is configured to move the control cable relative to the tubular part in response to a first operation of the first operating device. The take-up device is configured to move the control cable relative to the tubular part in response to a second operation of the second operating device.

In accordance with a fifteenth aspect of the present invention, the bicycle operating system according to the fourteenth aspect is configured so that the second operating device is a separate device from the first operating device.

In accordance with a sixteenth aspect of the present invention, the bicycle operating system according to the fourteenth aspect is configured so that the first operating device, the second operating device and the take-up device are mounted to the bicycle body independently of each other.

In accordance with a seventeenth aspect of the present invention, the bicycle operating system according to the fourteenth aspect is configured so that the first operating device is disposed on a first side with respect to a transverse center of the bicycle body. The second operating device is disposed on a second side with respect to the transverse center of the bicycle body, the second side being opposite to the first side with respect to the transverse center of the bicycle body.

In accordance with an eighteenth aspect of the present invention, the bicycle operating system according to the fourteenth aspect is configured so that the first operating device is configured to be mounted to a first part of a handlebar. The second operating device is configured to be mounted to a second part of the handlebar. The second part is opposite to the first part with respect to a transverse center of the bicycle body.

In accordance with a nineteenth aspect of the present invention, the bicycle operating system according to the fourteenth aspect is configured so that the take-up device is configured to pull the control cable in response to the first operation of the first operating device. The take-up device is configured to release the control cable in response to the second operation of the second operating device.

In accordance with a twentieth aspect of the present invention, the bicycle operating system according to the fourteenth aspect is configured so that the take-up device includes a take-up member configured to be rotatable relative to the tubular part about a rotational axis to pull and release the control cable. The take-up member is configured to be provided in the tubular part.

In accordance with a twenty-first aspect of the present invention, the bicycle operating system according to the twentieth aspect is configured so that the take-up device includes a first rotatable member configured to be rotatable relative to the tubular part about the rotational axis, the take-up member being configured to pull the control cable in response to rotation of the first rotatable member. The first rotatable member is configured to be provided in the tubular part. The first rotatable member is operatively coupled to the first operating device via the first control element to rotate relative to the tubular part about the rotational axis in response to the first operation of the first operating device.

In accordance with a twenty-second aspect of the present invention, the bicycle operating system according to the twenty-first aspect is configured so that the take-up device includes a second rotatable member configured to be rotatable relative to the tubular part about the rotational axis. The take-up member is configured to release the control cable in response to rotation of the second rotatable member. The second rotatable member is configured to be provided in the tubular part. The second rotatable member is operatively coupled to the second operating device via the second control element to rotate relative to the tubular part about the rotational axis in response to the second operation of the second operating device.

In accordance with a twenty-third aspect of the present invention, the bicycle operating system according to the twenty-second aspect is configured so that the first rotatable member and the second rotatable member are aligned with the take-up member inside the tubular part such that the rotational axis extends in a longitudinal direction of the tubular part.

In accordance with a twenty-fourth aspect of the present invention, the bicycle operating system according to the twenty-second aspect is configured so that the take-up device includes a biasing member and a ratchet structure. The biasing member is configured to be provided in the tubular part and is configured to bias the take-up member in a rotational direction of the take-up member. The ratchet structure is configured to be provided in the tubular part and is configured to position the take-up member relative to the tubular part against rotational biasing force of the biasing member.

In accordance with a twenty-fifth aspect of the present invention, the bicycle operating system according to the twenty-fourth aspect is configured so that the first rotatable member is configured to transmit the first operation of the first operating device to the take-up member to rotate the take-up member relative to the tubular part about the rotational axis against the rotational biasing force. The ratchet structure is configured to selectively maintain the take-up member at a plurality of positions relative to the tubular part.

In accordance with a twenty-sixth aspect of the present invention, the bicycle operating system according to the fourteenth aspect is configured so that the first operating device is disposed on a first side with respect to a transverse center of the bicycle body. The second operating device is disposed on a second side with respect to the transverse center of the bicycle body. The take-up device is configured to move the control cable in response to the first operation of the first operating device such that a bicycle chain is moved in a first transverse direction which directs from the second side to the first side. The take-up device is configured to move the control cable in response to the second operation of the second operating device such that the bicycle chain is moved in a second transverse direction opposite to the first transverse direction.

In accordance with a twenty-seventh aspect of the present invention, the bicycle operating system according to the first aspect further comprises a first cable holder configured to hold an outer casing of the first control element. The first cable holder is mounted to a periphery of the tubular part.

In accordance with a twenty-eighth aspect of the present invention, a take-up device comprises a take-up member, a first rotatable member, and a second rotatable member. The take-up member is rotatable about a rotational axis to pull and release a control cable configured to be connected to a bicycle component. The first rotatable member is rotatable about the rotational axis in response to a first operation of a first operating device. The take-up member is configured to pull the control cable in response to rotation of the first rotatable member. The second rotatable member is rotatable relative to the take-up member and the first rotatable member about the rotational axis in response to a second operation of a second operating device. The take-up member is configured to release the control cable in response to rotation of the second rotatable member. The second rotatable member is disposed between the first rotatable member and the take-up member.

In accordance with a twenty-ninth aspect of the present invention, a bicycle operating apparatus comprises a hydraulic device and a cable operating device. The hydraulic device is configured to be mounted to a bicycle body. The cable operating device is operatively coupled to a take-up device via a first control element. The take-up device is configured to be provided outside the bicycle operating apparatus and to move a control cable configured to be connected to a bicycle component. The cable operating device is configured to be attached to the hydraulic device.

In accordance with a thirtieth aspect of the present invention, the bicycle operating system according to the twenty-ninth aspect is configured so that the hydraulic device includes a bracket, a hydraulic cylinder, a piston, and an operating member. The bracket includes a gripping portion configured to be gripped by a rider. The piston is disposed within the hydraulic cylinder and is movable between an initial position and an actuated position. The operating member is movably mounted to the bracket and is operatively coupled to the piston to move the piston in response to movement of the operating member. The cable operating device is attached to the bracket.

In accordance with a thirty-first aspect of the present invention, the bicycle operating system according to the thirtieth aspect is configured so that the cable operating device is detachably attached to the bracket.

In accordance with a thirty-second aspect of the present invention, a bicycle operating system comprises a first operating device, a second operating device, and a take-up device. The second operating device is configured to be a separate device from the first operating device. The take-up device is configured to be mounted to the bicycle body independently of the first operating device and the second operating device. The take-up device is configured to be connected to a first end of a control cable. A second end of the control cable is fixedly connected to a bicycle component. The take-up device is operatively coupled to the first operating device via a first control element so as to move the control cable in a first direction in response to a first operation of the first operating device. The take-up device is operatively coupled to the second operating device via a second control element so as to move the control cable in a second direction different from the first direction in response to a second operation of the second operating device. The first control element comprises one of a mechanical control cable, a signal communication path and a liquid. The second control element comprises one of the mechanical control cable, the signal communication path and the liquid.

In accordance with a thirty-third aspect of the present invention, the bicycle operating system according to the thirty-second aspect is configured so that the take-up device includes a take-up member configured to move in the first direction and the second direction so as to change a length of the control cable between the take-up device and the bicycle component.

In accordance with a thirty-fourth aspect of the present invention, the bicycle operating system according to the thirty-third aspect is configured so that the bicycle component includes a base member, a movable member, and a link member. The base member is configured to be mounted to the bicycle body. The movable member is configured to move with respect to the base member. The link member is movably coupling the movable member to the base member. The second end of the control cable is fixedly connected to the link member.

In accordance with a thirty-fifth aspect of the present invention, the bicycle operating system according to the thirty-second aspect is configured so that the first operating device, the second operating device and the take-up device are mounted to the bicycle body independently of each other.

In accordance with a thirty-sixth aspect of the present invention, the bicycle operating system according to the thirty-fifth aspect is configured so that the first operating device is disposed on a first side with respect to a transverse center of the bicycle body. The second operating device is disposed on a second side with respect to the transverse center of the bicycle body, the second side being opposite to the first side with respect to the transverse center of the bicycle body.

In accordance with a thirty-seventh aspect of the present invention, the bicycle operating system according to the thirty-second aspect is configured so that the first operating device is configured to be mounted to a first part of a handlebar. The second operating device is configured to be mounted to a second part of the handlebar. The second part is opposite to the first part with respect to a transverse center of the bicycle body.

In accordance with a thirty-eighth aspect of the present invention, the bicycle operating system according to the thirty-second aspect is configured so that the take-up device is configured to be operatively connected to a first transmission device via a first control cable and is configured to be operatively connected to a second transmission device via a second control cable. The take-up device is configured to control a gear position of the first transmission device and a gear position of the second transmission device in response to a first operation of the first operating device.

In accordance with a thirty-ninth aspect of the present invention, the bicycle operating system according to the thirty-eighth aspect is configured so that the take-up device includes a first take-up member and a second take-up member. The first take-up member is configured to move the first control cable. The second take-up member is configured to move the second control cable. The first take-up member and the second take-up member are configured to move independently of each other in response to the first operation of the first operating device.

In accordance with a fortieth aspect of the present invention, the bicycle operating system according to the thirty-ninth aspect is configured so that the first take-up member and the second take-up member are configured to move simultaneously in response to the first operation of the first operating device.

In accordance with a forty-first aspect of the present invention, the bicycle operating system according to the thirty-eighth aspect is configured so that the first take-up member and the second take-up member are configured to be provided as a single unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 26 shows a shift table of a transmission apparatus to be operated with the bicycle operating system illustrated in FIG. 25.

DESCRIPTION OF THE EMBODIMENTS

Figure 1:
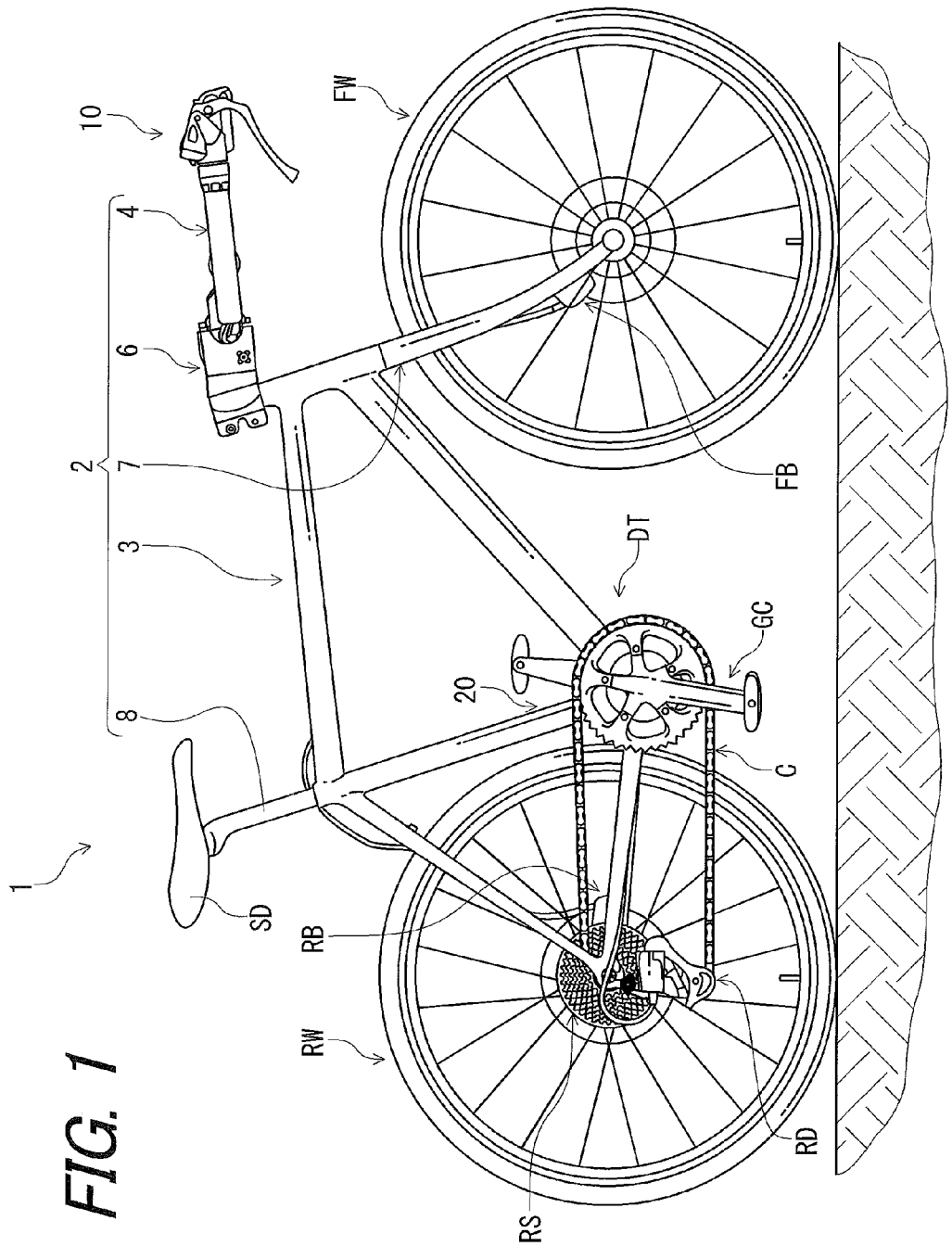
FIG. 1 is a side elevational view of a bicycle provided with a bicycle operating system in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 1 is illustrated that is provided with a bicycle operating system 10 in accordance with a first embodiment. The bicycle 1 further includes a bicycle body 2, a saddle SD, a front brake device FB, a rear brake device RB, a front wheel FW, a rear wheel RW, and a drive train DT. The bicycle body 2 includes a bicycle frame 3, a handlebar 4, a stem 6, a front fork 7, and a seatpost 8. The handlebar 4 is coupled to the front fork 7 by the stem 6. The front fork 7 is rotatably mounted to the bicycle frame 3.

Each of the front brake device FB and the rear brake device RB is a hydraulic disc brake device, for example. The drive train DT includes a gear crank GC, a bicycle chain C, a rear sprocket assembly RS, and a rear derailleur RD. In the illustrated embodiment, the bicycle operating system 10 is configured to operate the rear derailleur RD, the front brake device FB, and the rear brake device RB. Since constructions other than the bicycle operating system 10 are well known in the bicycle field, they will not be described and/or illustrated in detail here for the sake of brevity.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle SD of the bicycle 1 with facing the handlebar 4. Accordingly, these terms, as utilized to describe the bicycle operating system 10, should be interpreted relative to the bicycle 1 equipped with the bicycle operating system 10 as used in an upright riding position on a horizontal surface.

Figure 2:
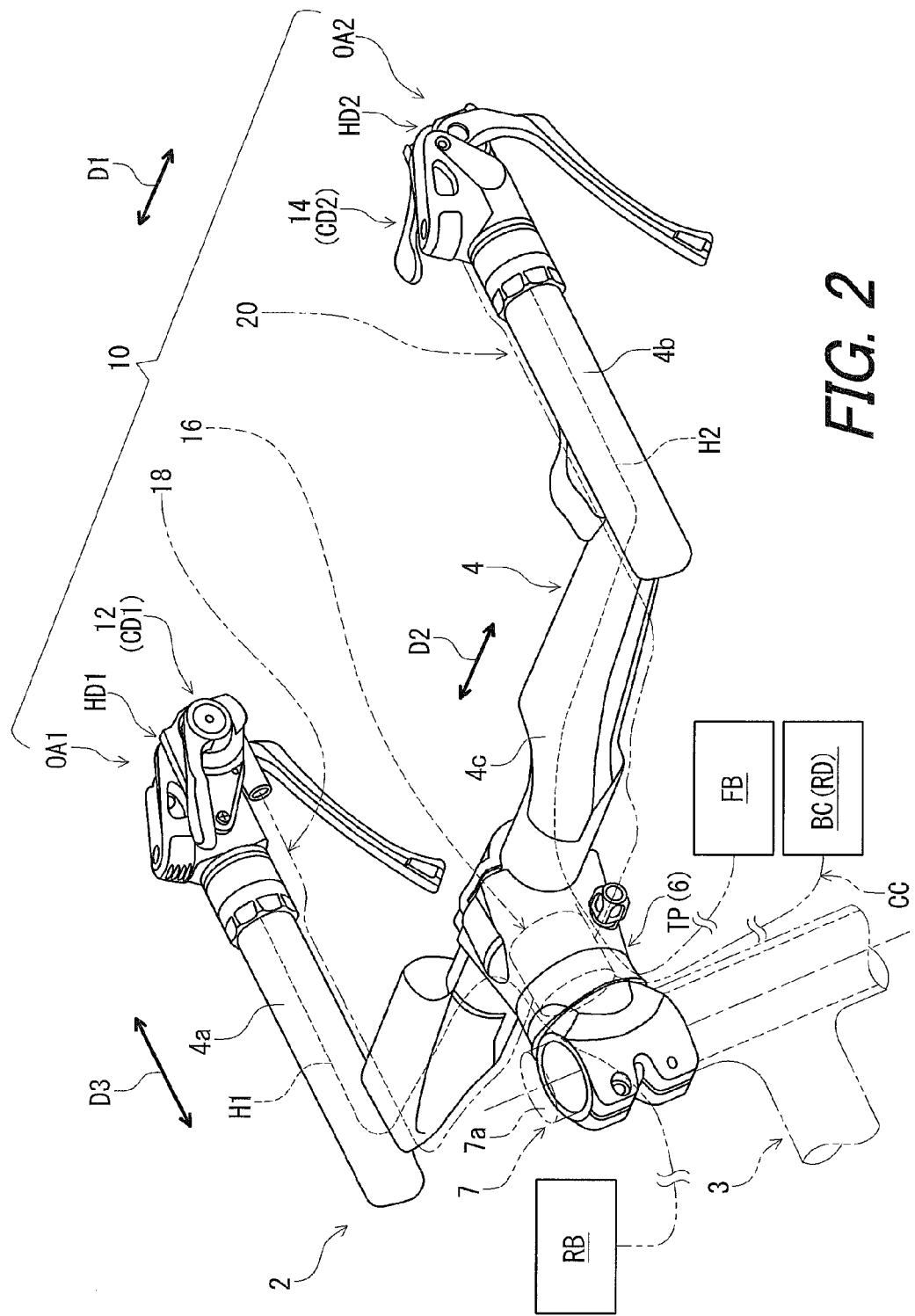
FIG. 2 is a perspective view of the bicycle operating system illustrated in FIG. 1.

As seen in FIG. 2, the bicycle operating system 10 comprises a first operating device 12. The first operating device 12 is configured to be mounted to the bicycle body 2. The bicycle operating system 10 further comprises a second operating device 14. The second operating device 14 is configured to be mounted to the bicycle body 2. In the illustrated embodiment, the first operating device 12 and the second operating device 14 are mounted to the handlebar 4 of the bicycle body 2. However, at least one of the first operating device 12 and the second operating device 14 can be mounted to other parts of the bicycle body 2.

Figure 3:
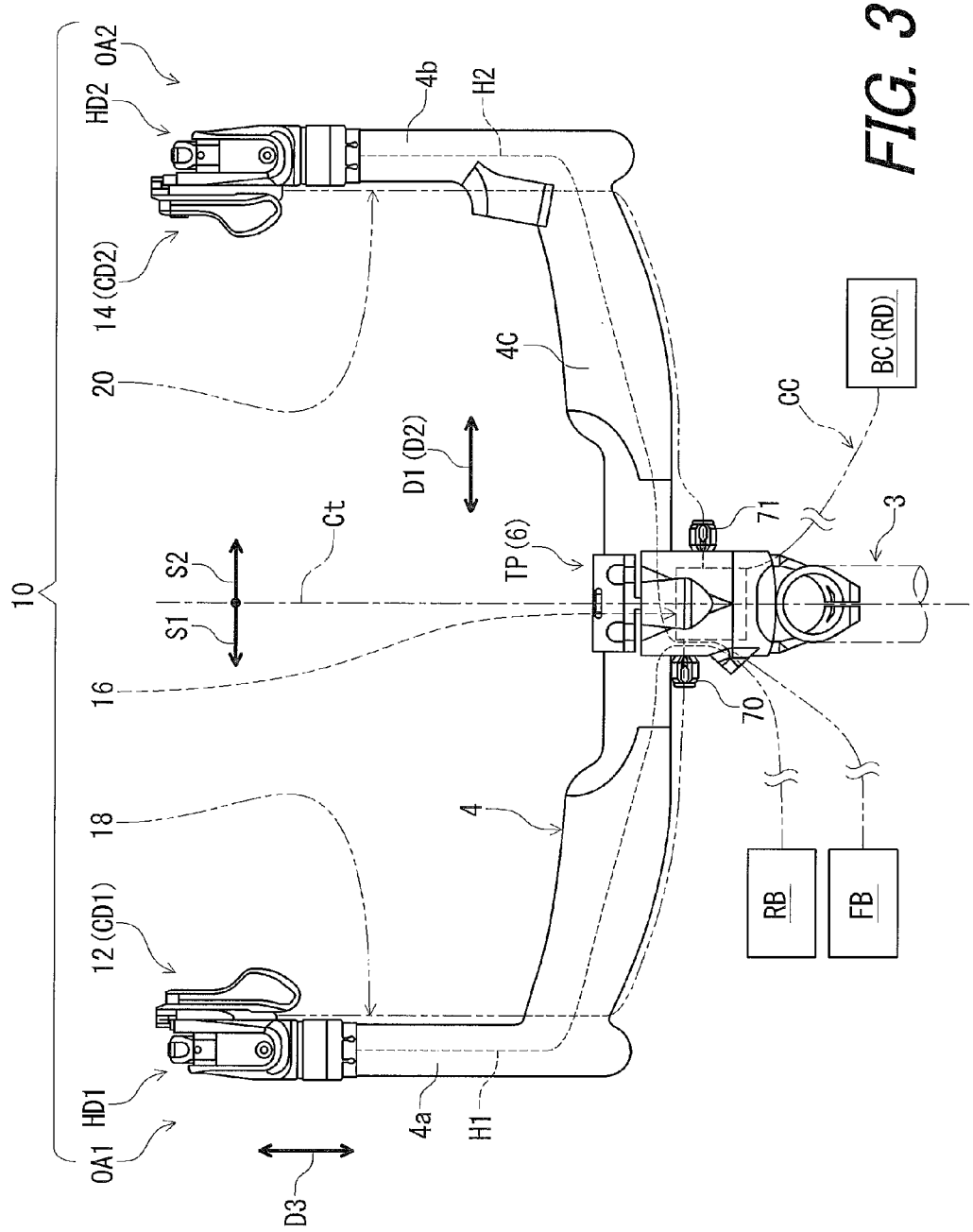
FIG. 3 is a plan view of the bicycle operating system illustrated in FIG. 1.

As seen in FIG. 3, the first operating device 12 is disposed on a first side S1 with respect to a transverse center Ct of the bicycle body 2. The second operating device 14 is disposed on a second side S2 with respect to the transverse center Ct of the bicycle body 2. More specifically, the first operating device 12 is disposed on the first side S1 with respect to the transverse center Ct of the bicycle body 2 in a state where the handlebar 4 is positioned at a neutral position. The second operating device 14 is disposed on the second side S2 with respect to the transverse center Ct of the bicycle body 2 in a state where the handlebar 4 is positioned at the neutral position. The second side S2 is opposite to the first side S1 with respect to the transverse center Ct of the bicycle body 2. In the illustrated embodiment, the first side S1 is a left side with respect to the transverse center Ct, and the second side S2 is a right side with respect to the transverse center Ct. Accordingly, the first and second operating devices 12 and 14 are laterally opposite to each other with respect to the transverse center Ct.

The transverse center Ct of the bicycle body 2 can be defined as a center plane of the bicycle body 2 (e.g., the bicycle frame 3) in a transverse direction D1 of the bicycle body 2. In the illustrated embodiment, the transverse center Ct of the bicycle body 2 can also be defined as a center plane of the handlebar 4 in a transverse direction D2 of the handlebar 4 in a state where the handlebar 4 is positioned at the neutral position. For example, the transverse center Ct extends through the stem 6.

The first operating device 12 is configured to be mounted to a first part 4a of a handlebar 4. The second operating device 14 is configured to be mounted to a second part 4b of the handlebar 4. The second part 4b is opposite to the first part 4a with respect to the transverse center Ct of the bicycle body 2. The first operating device 12 is configured to be mounted to the first part 4a. The second operating device 14 is configured to be mounted to the second part 4b.

The handlebar 4 includes a transverse bar part 4c extending in the transverse direction D1 of the bicycle body 2. The transverse bar part 4c extends in the transverse direction D2 of the handlebar 4. The first part 4a extends from one end of the transverse bar part 4c in a front-rear direction D3 of the bicycle body 2. The second part 4b extends from the other end of the transverse bar part 4c in the front-rear direction D3 of the bicycle body 2. The front-rear direction D3 is defined to be parallel to the transverse center Ct. In the illustrated embodiment, the first part 4a is provided on a left side relative to the transverse center Ct, and the second part 4b is provided on a right side relative to the transverse center Ct.

The first operating device 12 is a left operating device configured to be operated with a rider's left hand. The second operating device 14 is a right operating device configured to be operated with a rider's right hand. However, the first operating device 12 can be a right operating device, and the second operating device 14 can be a left operating device, if needed and/or desired.

As seen in FIG. 2, the bicycle operating system 10 comprises a take-up device 16. The take-up device 16 is a separate device from the first operating device 12. The take-up device 16 is a separate device from the second operating device 14. The second operating device 14 is a separate device from the first operating device 12. The take-up device 16 is configured to be mounted to the bicycle body 2 independently of the first operating device 12 and the second operating device 14. The first operating device 12 and the take-up device 16 are mounted to the bicycle body 2 independently of each other. The first operating device 12, the second operating device 14 and the take-up device 16 are mounted to the bicycle body 2 independently of each other. The take-up device 16 is configured to be provided in a tubular part TP of the bicycle body 2. Possible examples of the tubular part TP include the bicycle frame 3, the handlebar 4, the stem 6, the front fork 7, and the seatpost 8. In the illustrated embodiment, the tubular part TP comprises the stem 6 configured to couple the handlebar 4 to a steering column 7a of the front fork 7. The stem 6 is a separate member from the handlebar 4. The stem 6 can, however, be integrally provided with the handlebar 4 as a single unitary member if needed and/or desired. Furthermore, the take-up device 16 can be provided in other tubular parts such as the bicycle frame 3, the handlebar 4, the front fork 7, and the seatpost 8.

The take-up device 16 is configured to move a control cable CC configured to be connected to a bicycle component BC. The take-up device 16 is configured to be connected to a first end of the control cable CC. A second end of the control cable CC is fixedly connected to the bicycle component BC. Possible examples of the bicycle component BC include mechanically-operated devices such as a bicycle transmission, an adjustable suspension assembly, and a height adjustable seatpost assembly. In the illustrated embodiment, the bicycle component BC is the rear derailleur RD. Since such bicycle components are well known in the bicycle field, they will not be described and/or illustrated in detail here for the sake of brevity.

The bicycle operating system 10 further comprises a first control element 18 via which the take-up device 16 is operatively coupled to the first operating device 12. The take-up device 16 is operatively coupled to the first operating device 12 via the first control element 18. The take-up device 16 is operatively coupled to the first operating device 12 via the first control element 18 so as to move the control cable CC in a first direction in response to a first operation of the first operating device 12. For example, the first control element 18 comprises one of a mechanical control cable, a signal communication path and a liquid. In the illustrated embodiment, the first control element 18 comprises a mechanical control cable configured to transmit an operating force from the first operating device 12 to the take-up device 16. However, the first control element 18 can comprise one of the signal communication path, a fluid, and a light guide. Possible examples of the signal communication path include a wired communication path and a wireless communication path. Possible examples of the fluid include the liquid and air.

As seen in FIG. 2, the first control element 18 is configured to connect the first operating device 12 to the take-up device 16 such that the take-up device 16 moves the control cable CC in response to the first operation of the first operating device 12. The take-up device 16 is configured to move the control cable CC relative to the tubular part TP in response to the first operation of the first operating device 12. In the illustrated embodiment, the take-up device 16 is configured to pull the control cable CC in response to the first operation of the first operating device 12.

The bicycle operating system 10 further comprises a second control element 20 via which the take-up device 16 is operatively coupled to the second operating device 14. The take-up device 16 is configured to be operatively coupled to the second operating device 14 via a second control element 20. The take-up device 16 is operatively coupled to the second operating device 14 via the second control element 20 so as to move the control cable CC in a second direction different from the first direction in response to a second operation of the second operating device 14. The second control element 20 comprises one of the mechanical control cable, the signal communication path and the liquid. In the illustrated embodiment, the second control element 20 comprises a mechanical control cable configured to transmit an operating force from the second operating device 14 to the take-up device 16. However, the second control element 20 can comprise one of the signal communication path, the fluid, and the light guide.

As seen in FIG. 2, the second control element 20 is configured to connect the second operating device 14 to the take-up device 16 such that the take-up device 16 moves the control cable CC relative to the tubular part TP (e.g., the stem 6) in response to a second operation of the second operating device 14. The take-up device 16 is configured to move the control cable CC relative to the tubular part TP in response to a second operation of the second operating device 14. In the illustrated embodiment, the take-up device 16 is configured to release the control cable CC in response to the second operation of the second operating device 14.

In the illustrated embodiment, the first control element 18 and the second control element 20 are provided outside the bicycle body 2. At least one of the first control element 18 and the second control element 20 can, however, be provided inside the bicycle body 2. For example, the first control element 18 and the second control element 20 can extend through an inside of the handlebar 4 to be connected to the take-up device 16.

As seen in FIG. 2, a bicycle operating apparatus OA1 is mounted to the handlebar 4. The bicycle operating apparatus OA1 comprises a hydraulic device HD1 and a cable operating device CD1. The hydraulic device HD1 is configured to be mounted to the bicycle body 2. For example, the hydraulic device HD1 is mounted to the handlebar 4. The hydraulic device HD1 is fluidly connected to the rear brake device RB via a hydraulic hose H1. In the illustrated embodiment, the cable operating device CD1 corresponds to the first operating device 12. The first operating device 12 can also be referred to as the cable operating device CD1.

Figure 4:
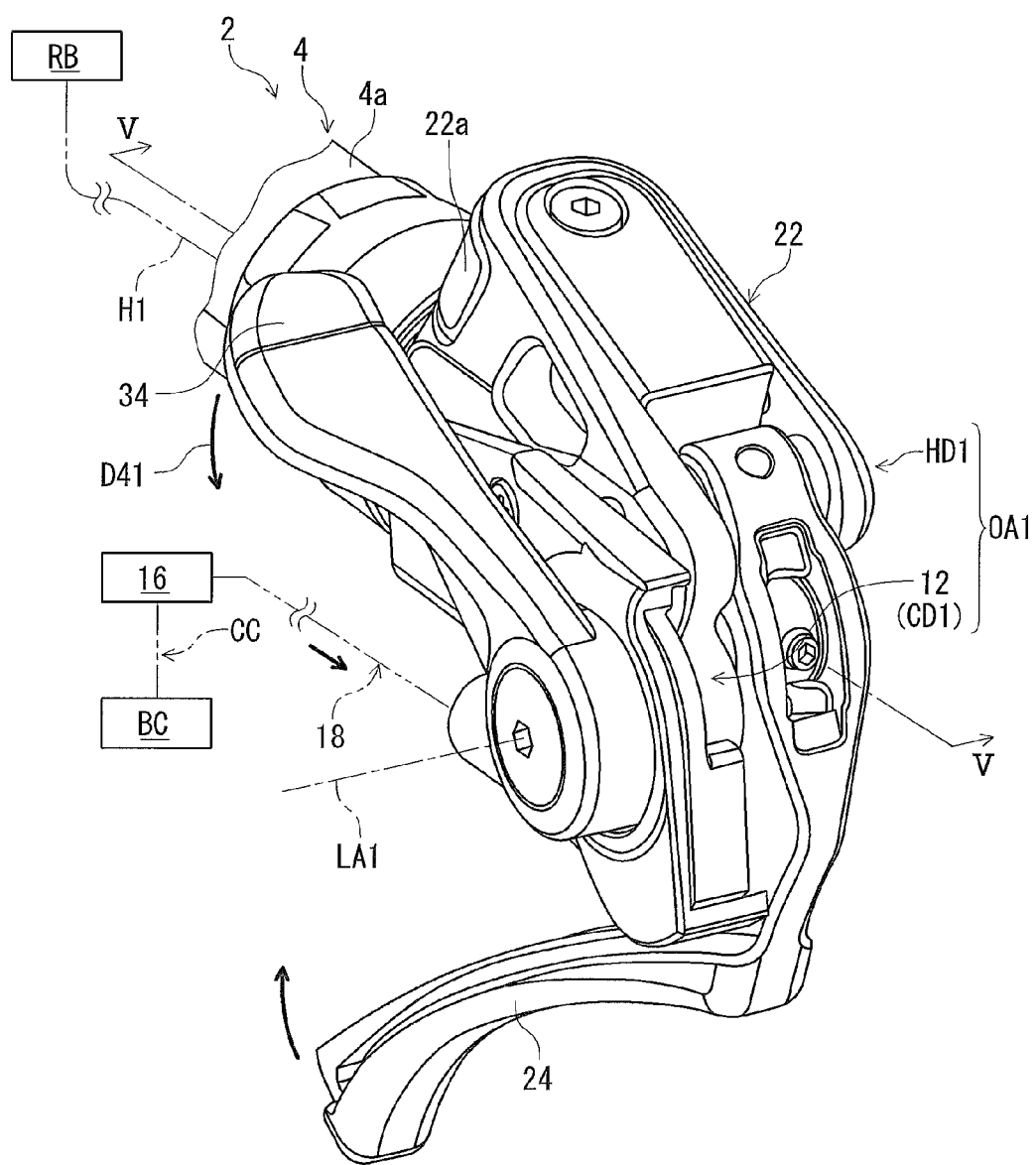
FIG. 4 is a perspective view of a bicycle operating apparatus of the bicycle operating system illustrated in FIG. 1.

As seen in FIG. 4, the cable operating device CD1 is configured to operate the take-up device 16 by moving the first control element 18. The take-up device 16 is configured to be provided outside the bicycle operating apparatus OA1 and to move the control cable CC configured to be connected to the bicycle component BC. The cable operating device CD1 is configured to be attached to the hydraulic device HD1.

The hydraulic device HD1 includes a bracket 22 and an operating member 24. The bracket 22 includes a gripping portion 22a configured to be gripped by a rider. The operating member 24 is movably mounted to the bracket 22. In the illustrated embodiment, the operating member 24 is a brake lever pivotable relative to the bracket 22 about a lever pivot axis LA1.

Figure 5:
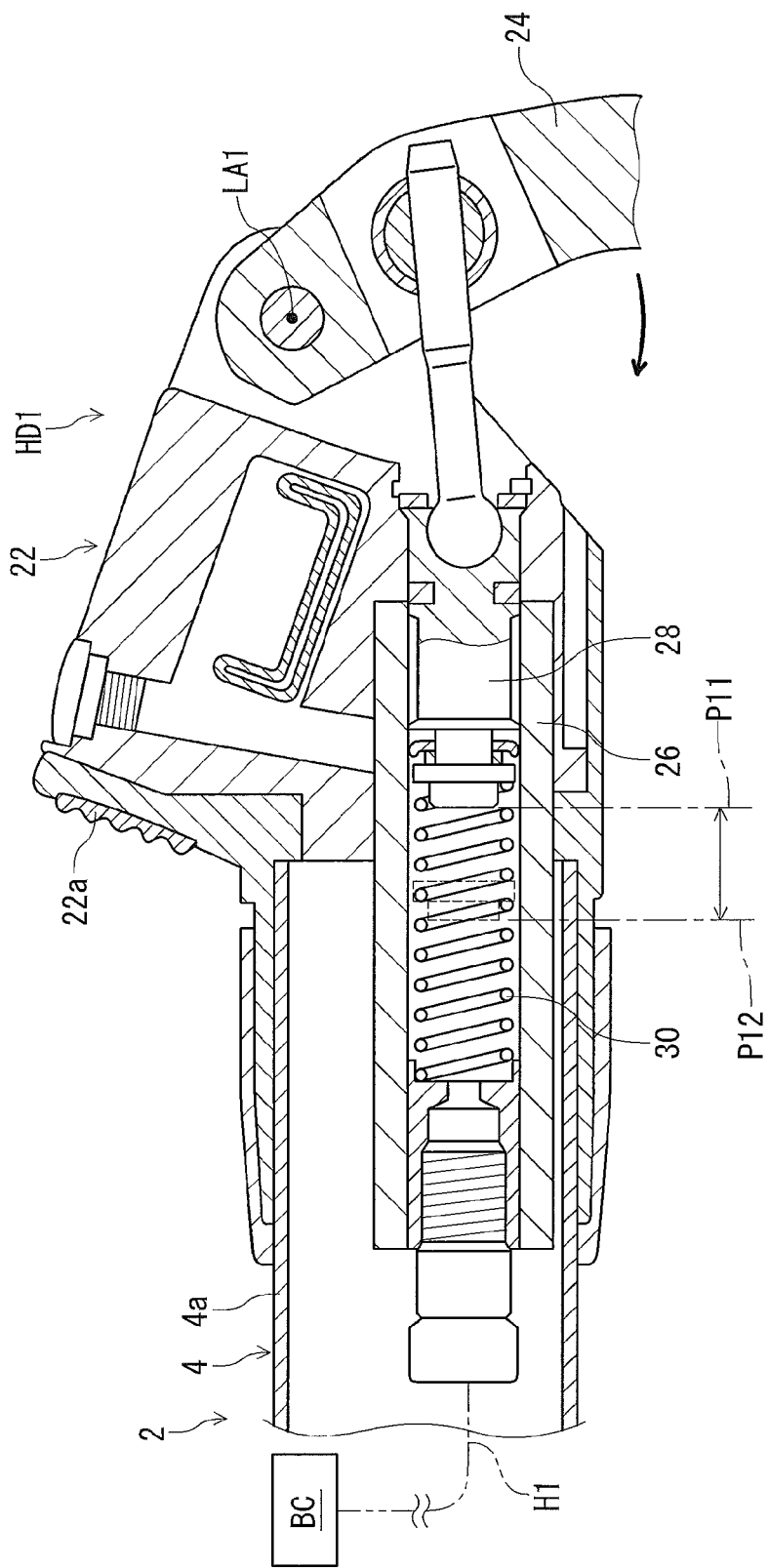
FIG. 5 is a cross-sectional view of the bicycle operating apparatus taken along line V-V of FIG. 4.

As seen in FIG. 5, the hydraulic device HD1 includes a hydraulic cylinder 26 and a piston 28. The piston 28 is disposed within the hydraulic cylinder 26 and is movable between an initial position P11 and an actuated position P12. The operating member 24 is operatively coupled to the piston 28 to move the piston 28 in response to movement of the operating member 24. The hydraulic device HD1 includes a spring 30 configured to bias the piston 28 from the actuated position P12 to the initial position P11.

Figure 6:
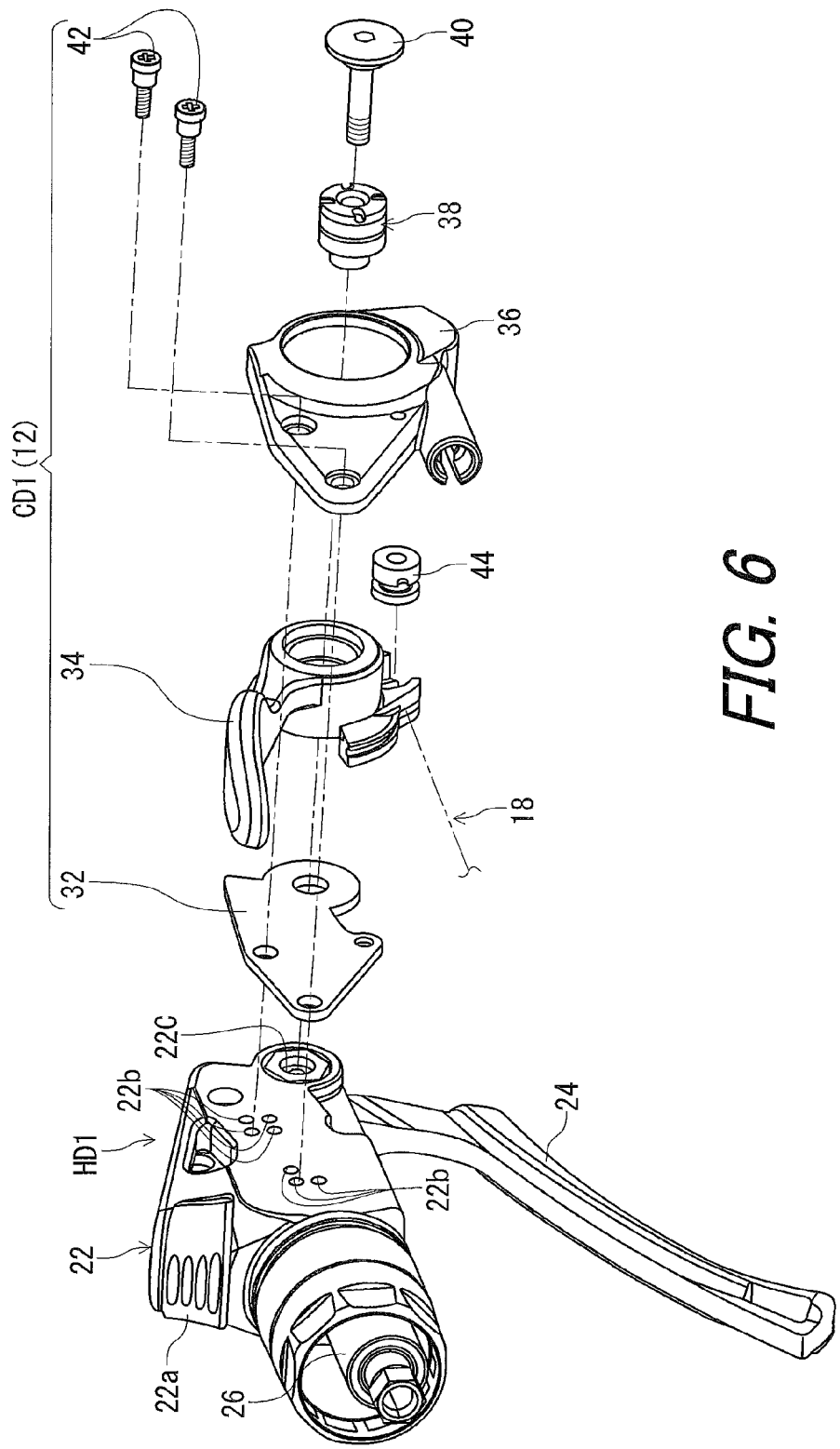
FIG. 6 is an exploded perspective view of the first operating device illustrated in FIG. 4.

As seen in FIG. 6, the cable operating device CD1 is attached to the bracket 22. More specifically, the cable operating device CD1 is detachably attached to the bracket 22. The cable operating device CD1 includes a base plate 32, an operating member 34, a cover member 36, a bush structure 38, and an attachment bolt 40. The base plate 32 and the cover member 36 are attached to the bracket 22 of the hydraulic device HD1 with screws 42. The bracket 22 includes threaded holes 22b provided at different positions. It is possible to adjust relative position between the cable operating device CD1 and the hydraulic device HD1 by changing the threaded holes 22b to which the screws 42 are screwed.

The operating member 34 is provided between the base plate 32 and the cover member 36. The attachment bolt 40 is screwed in a screw hole 22c of the bracket 22. The bush structure 38 is attached to the bracket 22 by the attachment bolt 40. The operating member 34 is pivotably supported by the attachment bolt 40 via the bush structure 38. An end of the first control element 18 is connected to the operating member 34 via an attachment part 44.

As seen in FIG. 4, when the operating member 34 is pivoted by a user (e.g., a rider) in a first pivot direction D41, the first control element 18 is pulled via the operating member 34. In the illustrated embodiment, the first operation of the first operating device 12 includes a pivotal operation of the operating member 34. However, the first operation of the first operating device 12 can include operations other than the pivotal operation instead of or in addition to the pivotal operation.

As seen in FIG. 2, a bicycle operating apparatus OA2 is mounted to the handlebar 4. More specifically, the bicycle operating apparatus OA2 comprises a hydraulic device HD2 and a cable operating device CD2. The hydraulic device HD2 is configured to be mounted to the bicycle body 2. For example, the hydraulic device HD2 is mounted to the handlebar 4. The hydraulic device HD2 is fluidly connected to the front brake device FB via a hydraulic hose H2. In the illustrated embodiment, the cable operating device CD2 corresponds to the second operating device 14. The second operating device 14 can also be referred to as the cable operating device CD2.

Figure 7:
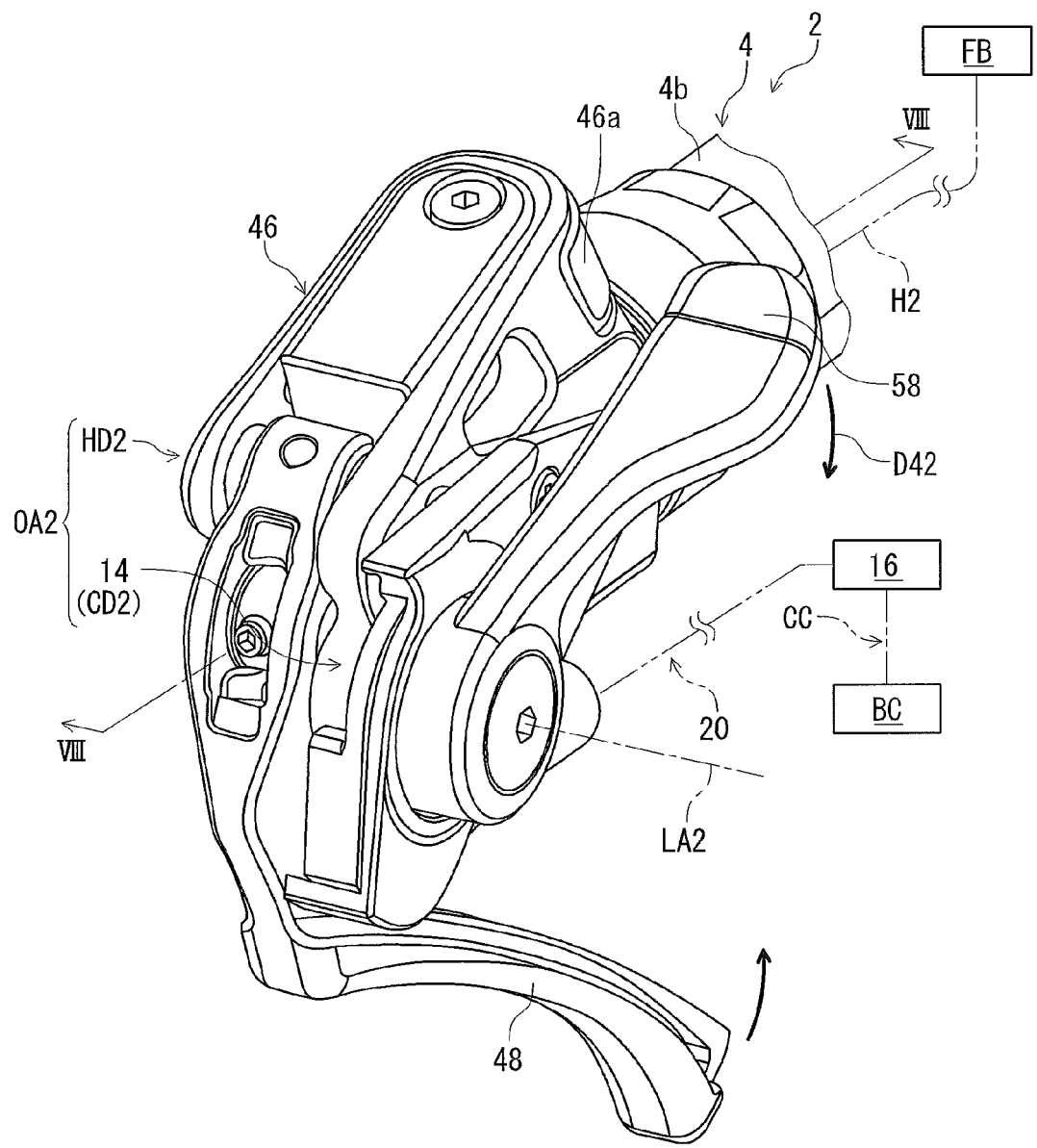
FIG. 7 is a perspective view of a bicycle operating apparatus of the bicycle operating system illustrated in FIG. 1.

As seen in FIG. 7, the cable operating device CD2 is configured to operate the take-up device 16 by moving the second control element 20. The take-up device 16 is configured to be provided outside the bicycle operating apparatus OA2 and to move the control cable CC configured to be connected to the bicycle component BC. The cable operating device CD2 is configured to be attached to the hydraulic device HD2.

The hydraulic device HD2 includes a bracket 46 and an operating member 48. The bracket 46 includes a gripping portion 46a configured to be gripped by a rider. The operating member 48 is movably mounted to the bracket 46. In the illustrated embodiment, the operating member 48 is a brake lever pivotable relative to the bracket 46 about a lever pivot axis LA2.

Figure 8:
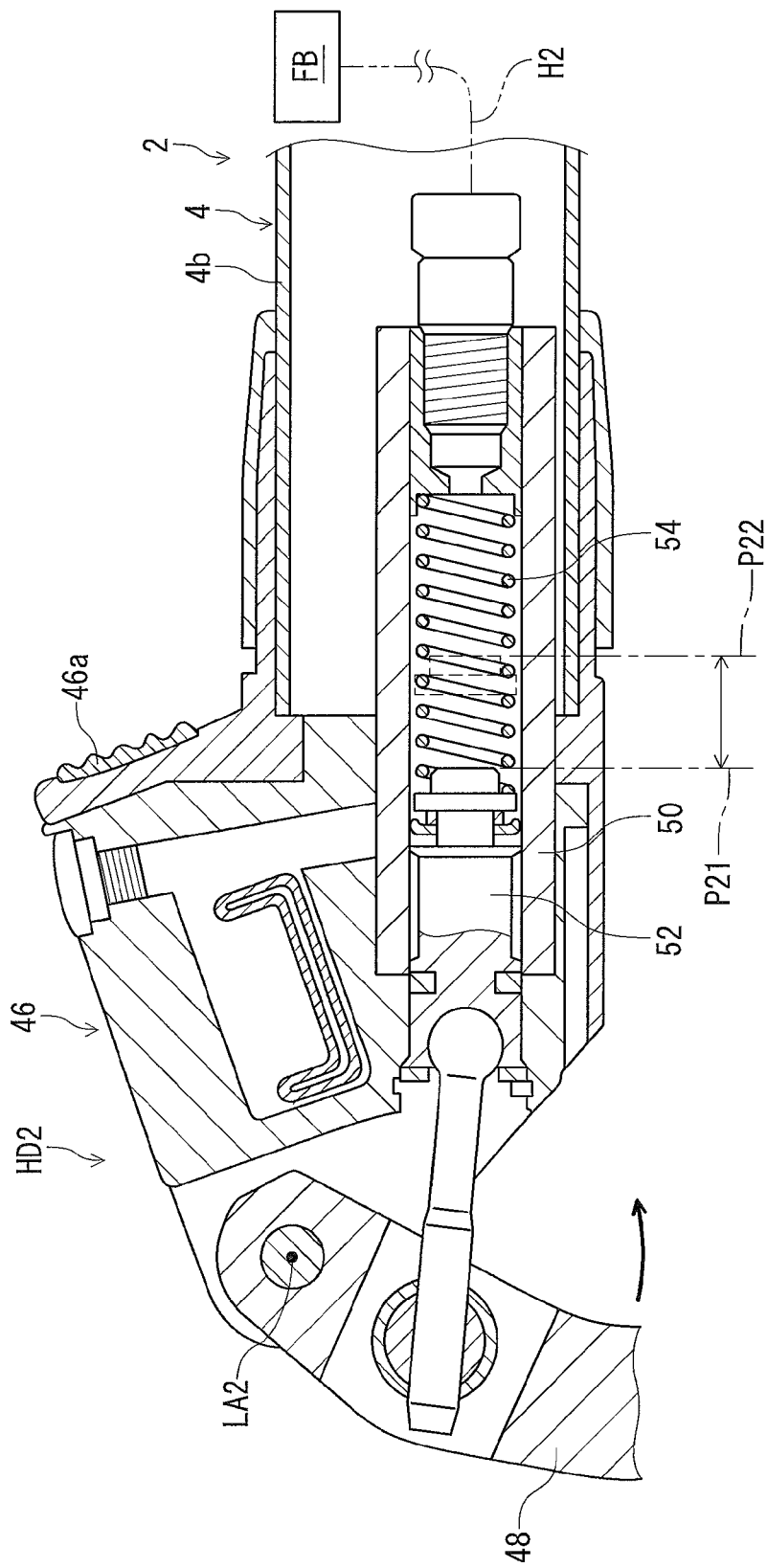
FIG. 8 is a cross-sectional view of the bicycle operating apparatus taken along line VIII-VIII of FIG. 7.

As seen in FIG. 8, the hydraulic device HD2 includes a hydraulic cylinder 50 and a piston 52. The piston 52 is disposed within the hydraulic cylinder 50 and is movable between an initial position P21 and an actuated position P22. The operating member 48 is operatively coupled to the piston 52 to move the piston 52 in response to movement of the operating member 48. The hydraulic device HD2 includes a spring 54 configured to bias the piston 52 from the actuated position P22 to the initial position P21.

Figure 9:
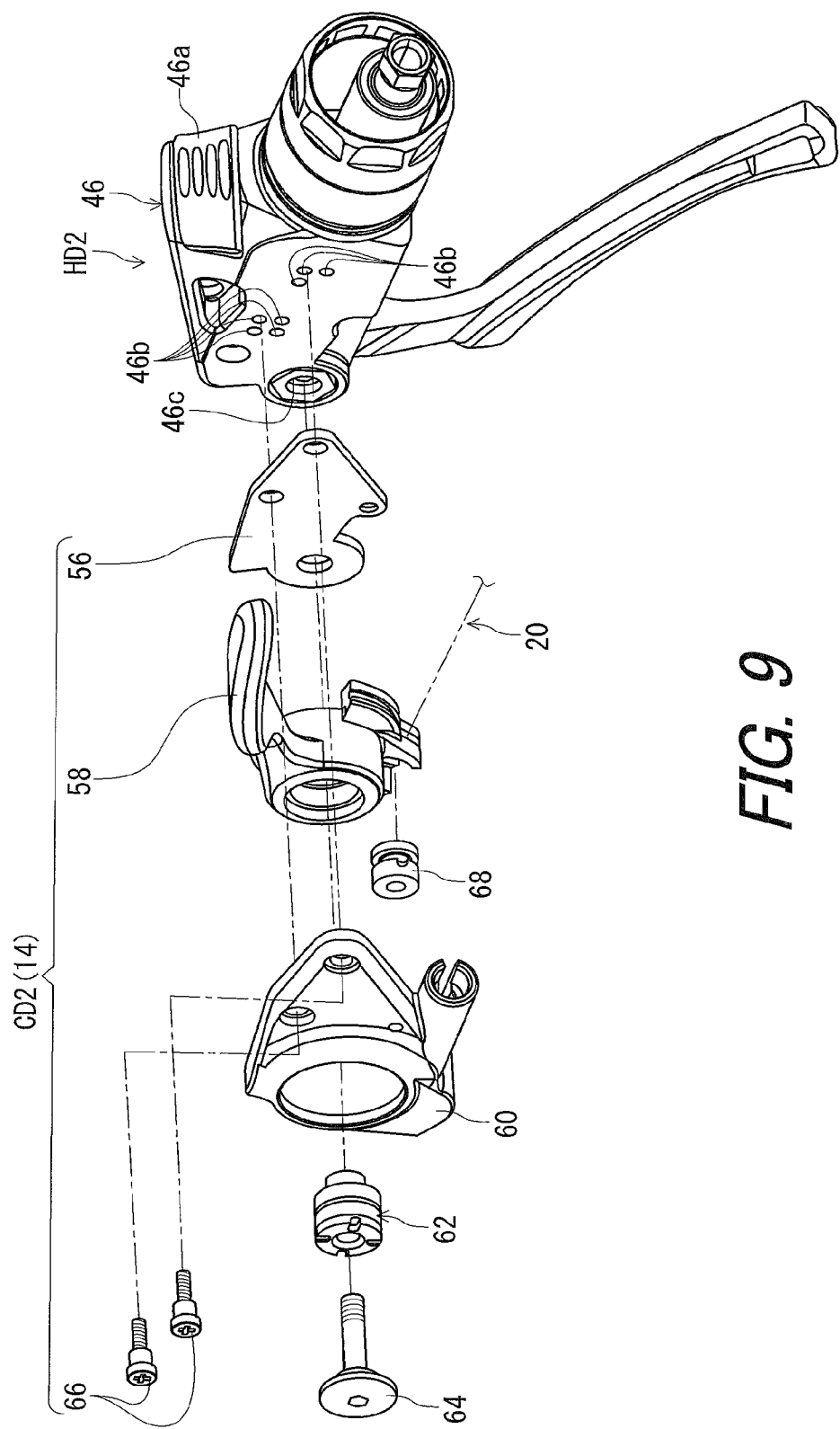
FIG. 9 is an exploded perspective view of the bicycle operating apparatus illustrated in FIG. 7.

As seen in FIG. 9, the cable operating device CD2 is attached to the bracket 46. More specifically, the cable operating device CD2 is detachably attached to the bracket 46. The cable operating device CD2 includes a base plate 56, an operating member 58, a cover member 60, a bush structure 62, and an attachment bolt 64. The base plate 56 and the cover member 60 are attached to the bracket 46 of the hydraulic device HD2 with screws 66. The bracket 46 includes threaded holes 46b provided at different positions. It is possible to adjust relative position between the cable operating device CD2 and the hydraulic device HD2 by changing the threaded holes 46b to which the screws 66 are screwed.

The operating member 58 is provided between the base plate 56 and the cover member 60. The attachment bolt 64 is screwed in a screw hole 46c of the bracket 46. The bush structure 62 is attached to the bracket 46 by the attachment bolt 64. The operating member 58 is pivotably supported by the attachment bolt 64 via the bush structure 62. An end of the second control element 20 is connected to the operating member 58 via an attachment part 68.

As seen in FIG. 7, when the operating member 58 is pivoted by a user (e.g., a rider) in a second, pivot direction D42, the second control element 20 is pulled via the operating member 58. In the illustrated embodiment, the second operation of the second operating device 14 includes a pivotal operation of the operating member 58. However, the second operation of the second operating device 14 can include operations (e.g., sliding operation) other than the pivotal operation instead of or in addition to the pivotal operation.

Figure 10:
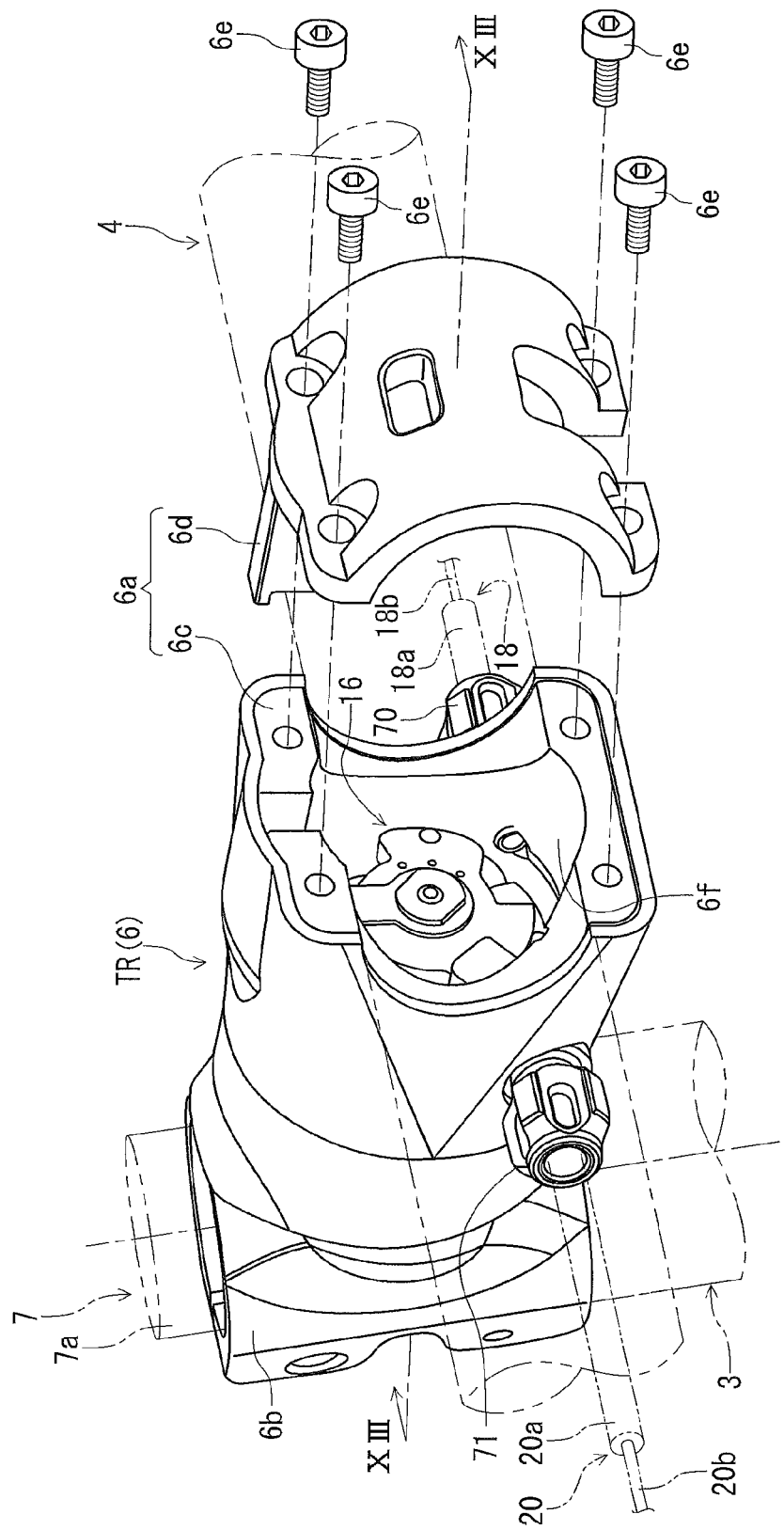
FIG. 10 is a perspective view of a take-up device provided in a tubular part of the bicycle illustrated in FIG. 1.

As seen in FIG. 10, the first operation and the second operation are transmitted to the take-up device 16 provided in the stem 6 via the first control element 18 and the second control element 20. The stem 6 includes a first attachment portion 6a and a second attachment portion 6b. The first attachment portion 6a is configured to be attached to the handlebar 4. In the illustrated embodiment, the first attachment portion 6a includes a first clamp part 6c and a second clamp part 6d. The second clamp part 6d is a separate part from the first clamp part 6c. The second clamp part 6d is secured to the first clamp part 6c by bolts 6e to clamp the handlebar 4 between the first clamp part 6c and the second clamp part 6d.

The second attachment portion 6b is configured to be attached to the steering column 7a. In the illustrated embodiment, the second attachment portion 6b is configured to clamp an upper part of the steering column 7a using bolts (not shown). The take-up device 16 is provided between the first attachment portion 6a and the second attachment portion 6b. More specifically, the stem 6 includes an internal space 6f extending between the first attachment portion 6a and the second attachment portion 6b. The take-up device 16 is provided in the internal space 6f. Since the second clamp part 6d is removably attached to the first clamp part 6c, the internal space 6f can be easily accessed in a state where the second clamp part 6d is removed from the first clamp part 6c. Thus, the take-up device 16 can be easily attached to and detached from the tubular part TP, allowing maintenance for the take-up device 16 to be easily performed.

As seen in FIG. 10, the bicycle operating system 10 further comprises a first cable holder 70 configured to hold an outer casing 18a of the first control element 18. The first control element 18 includes an inner wire 18b movably provided in the outer casing 18a. The first cable holder 70 is mounted to a periphery of the tubular part TP. The bicycle operating system 10 further comprises a second cable holder 71 configured to hold an outer casing 20a of the second control element 20. The second control element 20 includes an inner wire 20b movably provided in the outer casing 20a. The second cable holder 71 is mounted to the periphery of the tubular part TP.

In the illustrated embodiment, as seen in FIG. 3, the second cable holder 71 is provided on an opposite side of the first cable holder 70 relative to the tubular part TP. The first cable holder 70 protrudes from the tubular part TP in the transverse direction D2. The second cable holder 71 protrudes from the tubular part TP in the transverse direction D2. The first cable holder 70 is offset from the second cable holder 71 in the front-rear direction D3 of the bicycle body 2. The first cable holder 70 is disposed on the first side S1 with respect to the transverse center Ct of the bicycle body 2. The second cable holder 71 is disposed on the second side S2 with respect to the transverse center Ct of the bicycle body 2.

Figure 11:
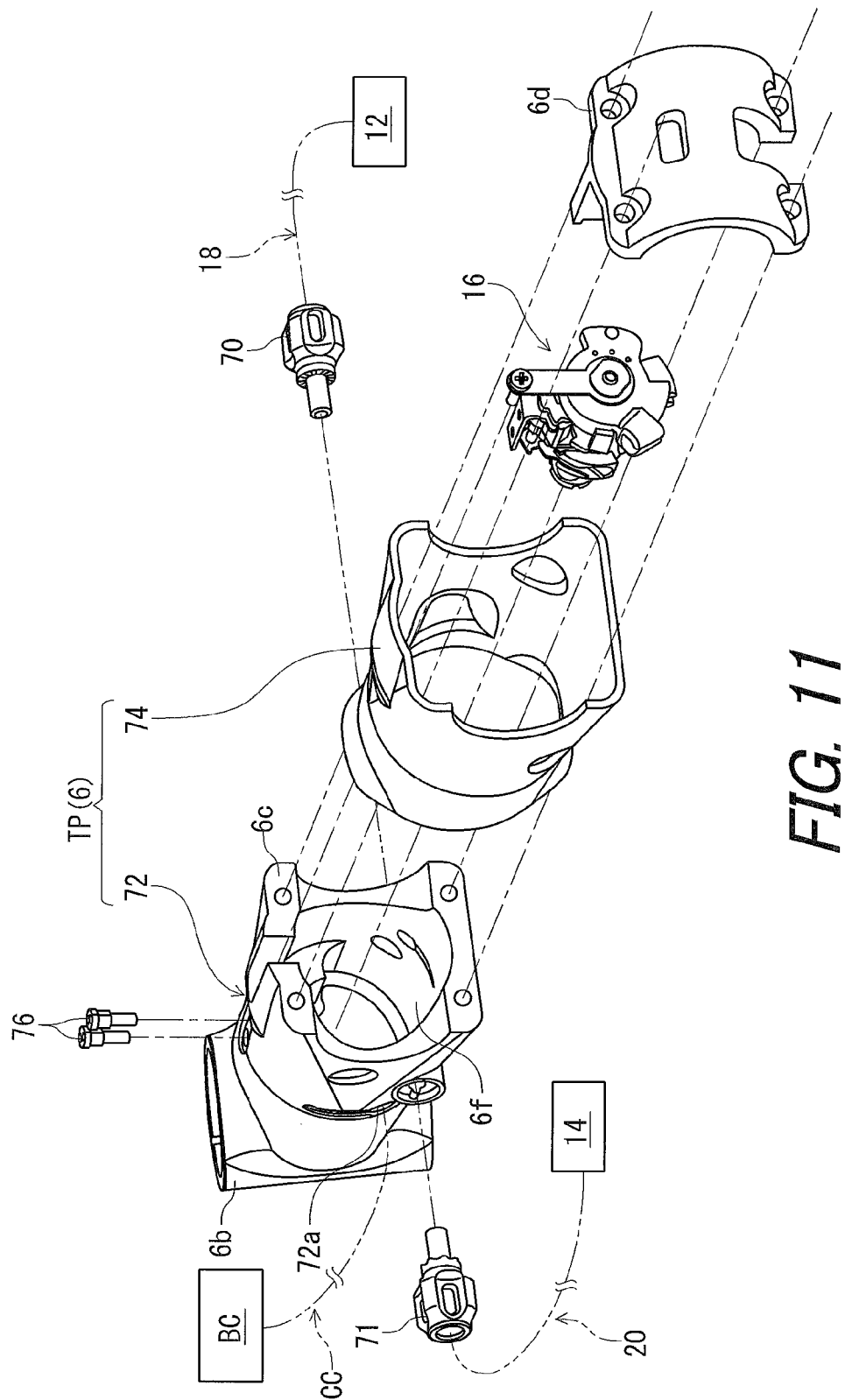
FIG. 11 is an exploded perspective view of the tubular part with the take-up device illustrated in FIG. 10.

As seen in FIG. 11, the stem 6 includes a stem body 72 and a cover 74. The stem body 72 includes the first clamp part 6c, the second attachment portion 6b, and the internal space 6f. The cover 74 is attached to the stem body 72 to cover the stem body 72. For example, the stem body 72 is made of a metallic material, and the cover 74 is made of a non-metallic material such as rubber. The cover 74 can, however, be omitted from the stem 6 if needed and/or desired.

The take-up device 16 is secured to the stem body 72 by screws 76. The stem body 72 includes a through-hole 72a through which the control cable CC extends from the take-up device 16 to the bicycle component BC.

Figure 12:
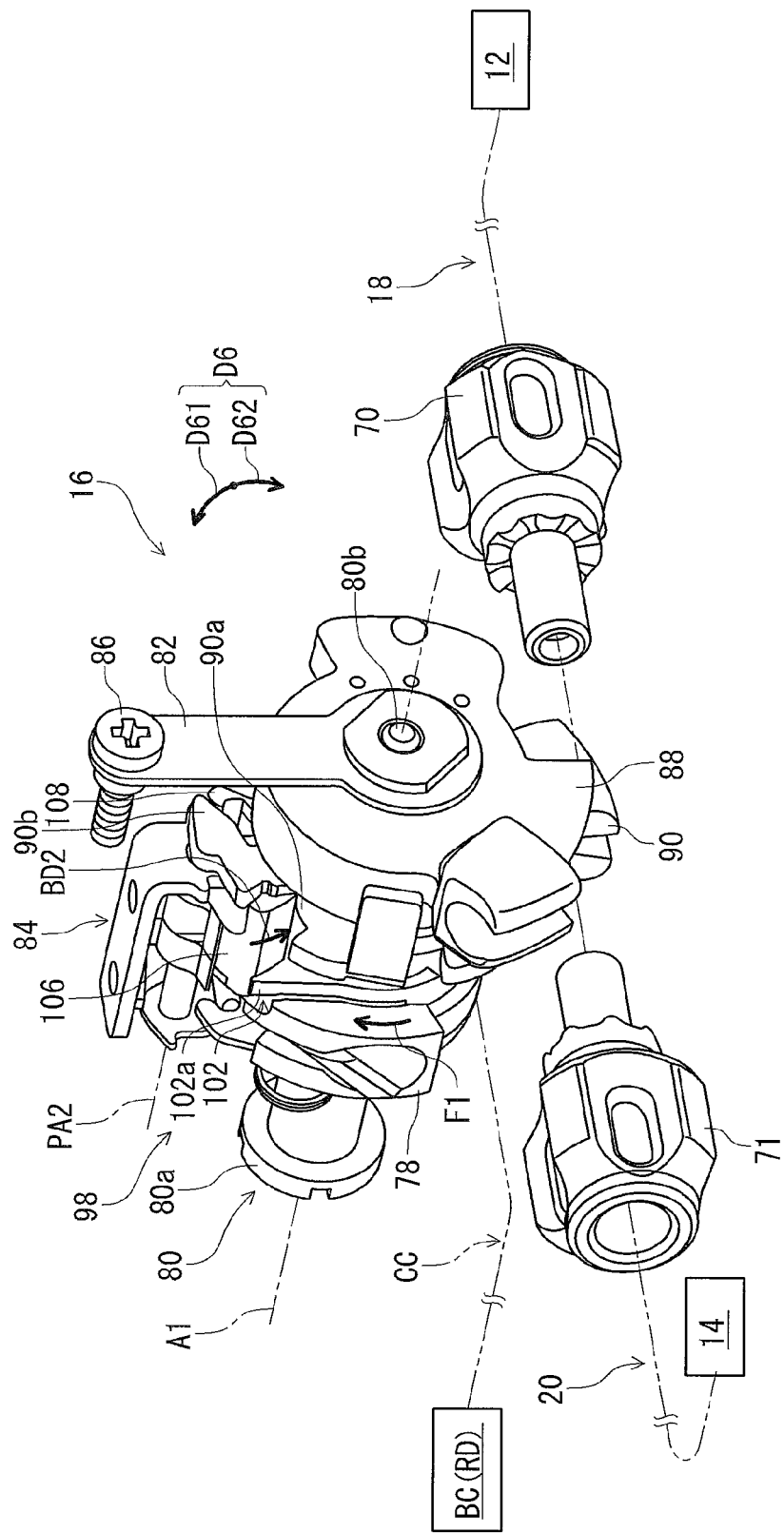
FIG. 12 is a perspective view of the take-up device illustrated in FIG. 10.

As seen in FIG. 12, the take-up device 16 includes a take-up member 78 configured to move in the first direction and the second direction so as to change a length of the control cable CC between the take-up device 16 and the bicycle component BC. The take-up member 78 is configured to be rotatable relative to the tubular part TP about a rotational axis A1 to pull and release the control cable CC. In other words, the take-up member 78 is rotatable relative to the tubular part TP about the rotational axis A1 to wind and unwind the control cable CC. The take-up member 78 is rotatable in a first rotational direction D61 and a second rotational direction D62 so as to change the length of the control cable CC between the take-up device 16 and the bicycle component BC. The second rotational direction D62 is opposite to the first rotational direction D61. The rotational axis A1 substantially corresponds to a central axis of the tubular part TP. The take-up device 16 includes a support shaft 80, a support plate 82, and a base member 84. The support shaft 80 is configured to rotatably support the take-up member 78 about the rotational axis A1.

Figure 13:
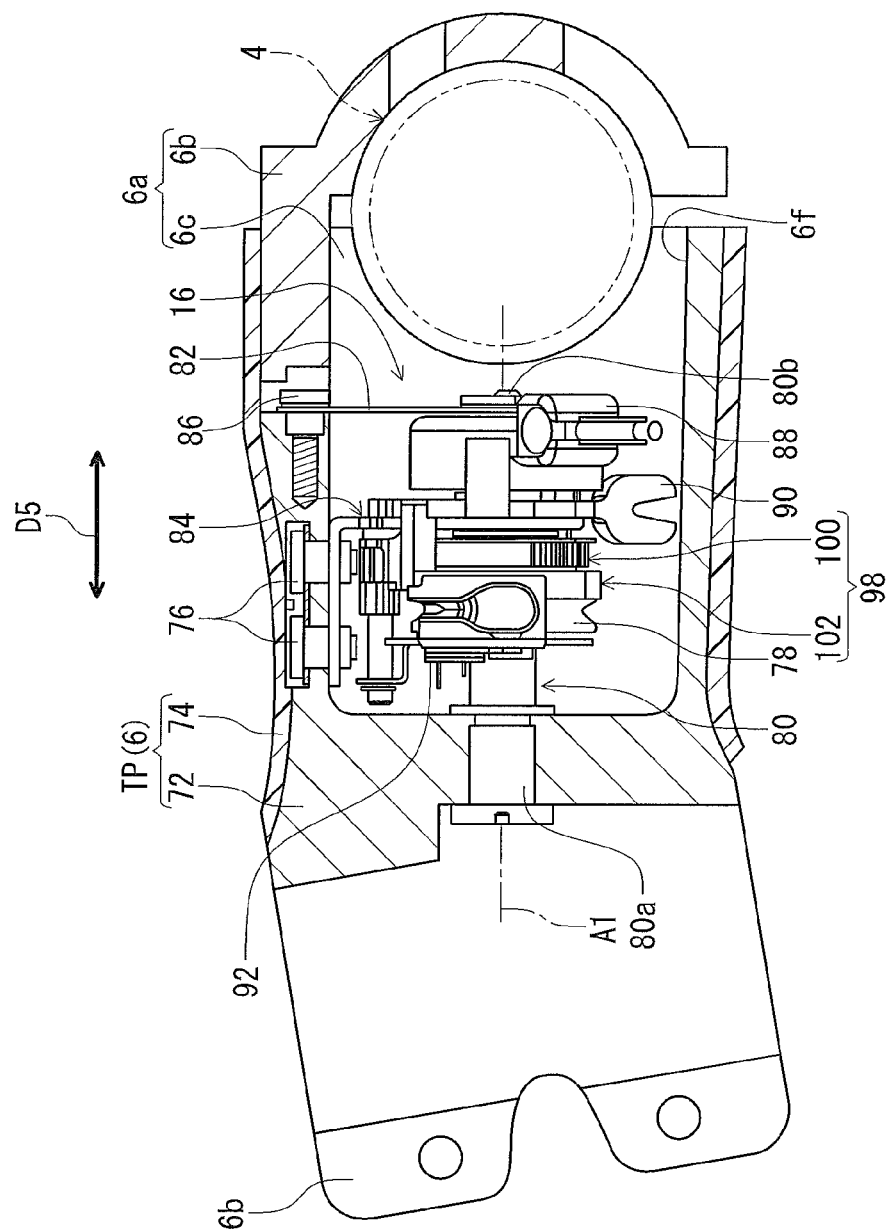
FIG. 13 is a cross-sectional view of the take-up device and the tubular part taken along line XIII-XIII of FIG. 10.

As seen in FIG. 13, a first end 80a of the support shaft 80 is attached to the stem 6 (FIG. 11). A second end 80b of the support shaft 80 is attached to the stem 6 via the support plate 82. The support plate 82 is secured to the stem 6 by a screw 86. The base member 84 is secured to the stem 6 by the screws 76.

As seen in FIG. 12, the take-up device 16 includes a first rotatable member 88 configured to be rotatable relative to the tubular part TP (FIG. 13) about the rotational axis A1. The first rotatable member 88 is rotatably supported by the support shaft 80 about the rotational axis A1. For example, the first rotatable member 88 is biased by a first rotational biasing element (not shown) in the second rotational direction D62. The first rotatable member 88 is rotatable about the rotational axis A1 in response to the first operation of the first operating device 12. The first rotatable member 88 is operatively coupled to the first operating device 12 via the first control element 18 to rotate relative to the tubular part TP (FIG. 13) about the rotational axis A1 in response to the first operation of the first operating device 12. More specifically, the first rotatable member 88 is connected to the first operating device 12 via the first control element 18 to rotate relative to the tubular part TP (FIG. 13) about the rotational axis A1 in response to the first operation of the first operating device 12. The take-up member 78 is configured to pull the control cable CC in response to rotation of the first rotatable member 88.

The take-up device 16 includes a second rotatable member 90 configured to be rotatable relative to the tubular part TP (FIG. 13) about the rotational axis A1. The second rotatable member 90 is rotatably supported by the support shaft 80 about the rotational axis A1. For example, the second rotatable member 90 is biased by a second rotational biasing element (not shown) in the first rotational direction D61. The second rotatable member 90 is rotatable relative to the take-up member 78 and the first rotatable member 88 about the rotational axis A1 in response to the second operation of the second operating device 14. The second rotatable member 90 is operatively coupled to the second operating device 14 via the second control element 20 to rotate relative to the tubular part TP (FIG. 13) about the rotational axis A1 in response to the second operation of the second operating device 14. More specifically, the second rotatable member 90 is connected to the second operating device 14 via the second control element 20 to rotate relative to the tubular part TP (FIG. 13) about the rotational axis A1 in response to the second operation of the second operating device 14. The take-up member 78 is configured to release the control cable CC in response to rotation of the second rotatable member 90.

As seen in FIG. 13, the take-up member 78 is configured to be provided in the tubular part TP. The first rotatable member 88 is configured to be provided in the tubular part TP. The second rotatable member 90 is configured to be provided in the tubular part TP. The first rotatable member 88 and the second rotatable member 90 are aligned with the take-up member 78 inside the tubular part TP such that the rotational axis A1 extends in a longitudinal direction D5 of the tubular part TP. This arrangement can make the take-up device 16 more compact, allowing the take-up member 78 to be disposed in the tubular part TP. The second rotatable member 90 is disposed between the first rotatable member 88 and the take-up member 78.

Figure 14:
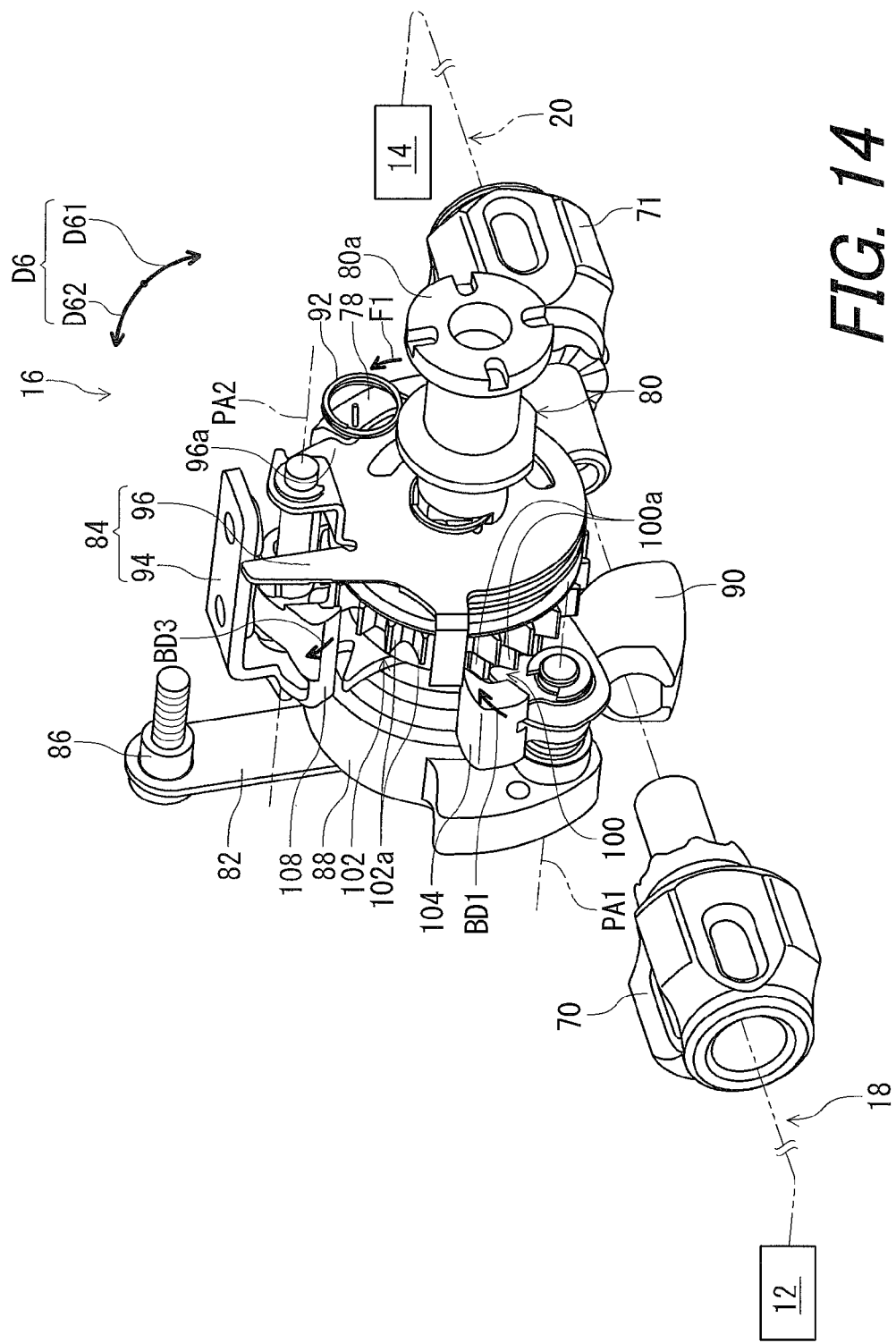
FIG. 14 is a perspective view of the take-up device illustrated in FIG. 10.

As seen in FIG. 14, the take-up device 16 includes a biasing member 92 configured to bias the take-up member 78 in a rotational direction D6 of the take-up member 78. The rotational direction D6 includes the first rotational direction D61 and the second rotational direction D62 opposite to the first rotational direction D61. In the illustrated embodiment, the biasing member 92 is configured to bias the take-up member 78 in the second rotational direction D62 of the rotational direction D6. The biasing member 92 is configured to apply a rotational biasing force F1 to the take-up member 78. The take-up member 78 is configured to rotate in the second rotational direction D62 to release (unwind) the control cable CC. The take-up member 78 is configured to rotate in the first rotational direction D61 of the rotational direction D6 to pull the control cable CC. As seen in FIG. 13, the biasing member 92 is configured to be provided in the tubular part TP.

As seen in FIG. 14, the base member 84 includes a first base member 94 and a second base member 96. The first base member 94 is attached to the tubular part TP. The second base member 96 is attached to the first base member 94. The second base member 96 includes a stopper 96a configured to contact the take-up member 78 to position the take-up member 78 at an initial position.

Figure 15:
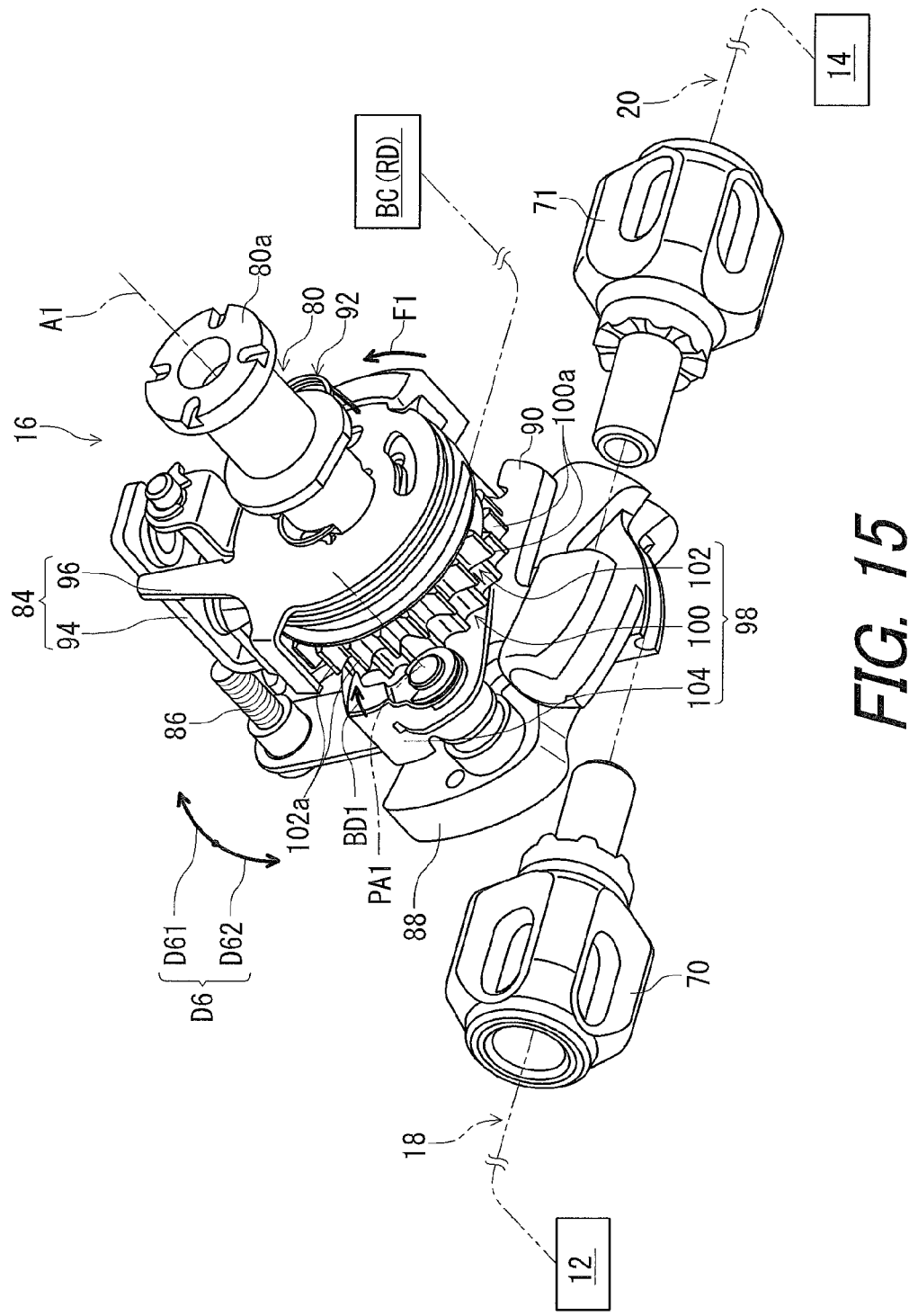
FIG. 15 is a perspective view of the take-up device illustrated in FIG. 10.

As seen in FIG. 15, the take-up device 16 includes a ratchet structure 98 configured to position the take-up member 78 relative to the tubular part TP against the rotational biasing force F1 of the biasing member 92. The ratchet structure 98 is configured to selectively maintain the take-up member 78 at a plurality of positions relative to the tubular part TP. As seen in FIG. 13, the ratchet structure 98 is configured to be provided in the tubular part TP.

As seen in FIG. 15, the ratchet structure 98 includes a transmitting member 100 and a positioning member 102. The transmitting member 100 and the positioning member 102 are coupled to the take-up member 78 and are rotatable integrally with the take-up member 78 about the rotational axis A1. The transmitting member 100 and the positioning member 102 are rotatably supported by the support shaft 80. The transmitting member 100 includes transmitting teeth 100a arranged in the rotational direction D6. The positioning member 102 includes positioning teeth 102a arranged in the rotational direction D6.

The ratchet structure 98 includes a transmitting pawl 104 configured to transmit the first operation of the first operating device 12 to the take-up member 78. The transmitting pawl 104 is mounted to the first rotatable member 88 pivotably about a first pivot axis PA1. The transmitting pawl 104 is rotatable integrally with the first rotatable member 88 about the rotational axis A1. The transmitting pawl 104 is biased by a first biasing element (not shown) to pivot relative to the base member 84 about the first pivot axis PA1 in a first biasing direction BD1.

Figure 16:
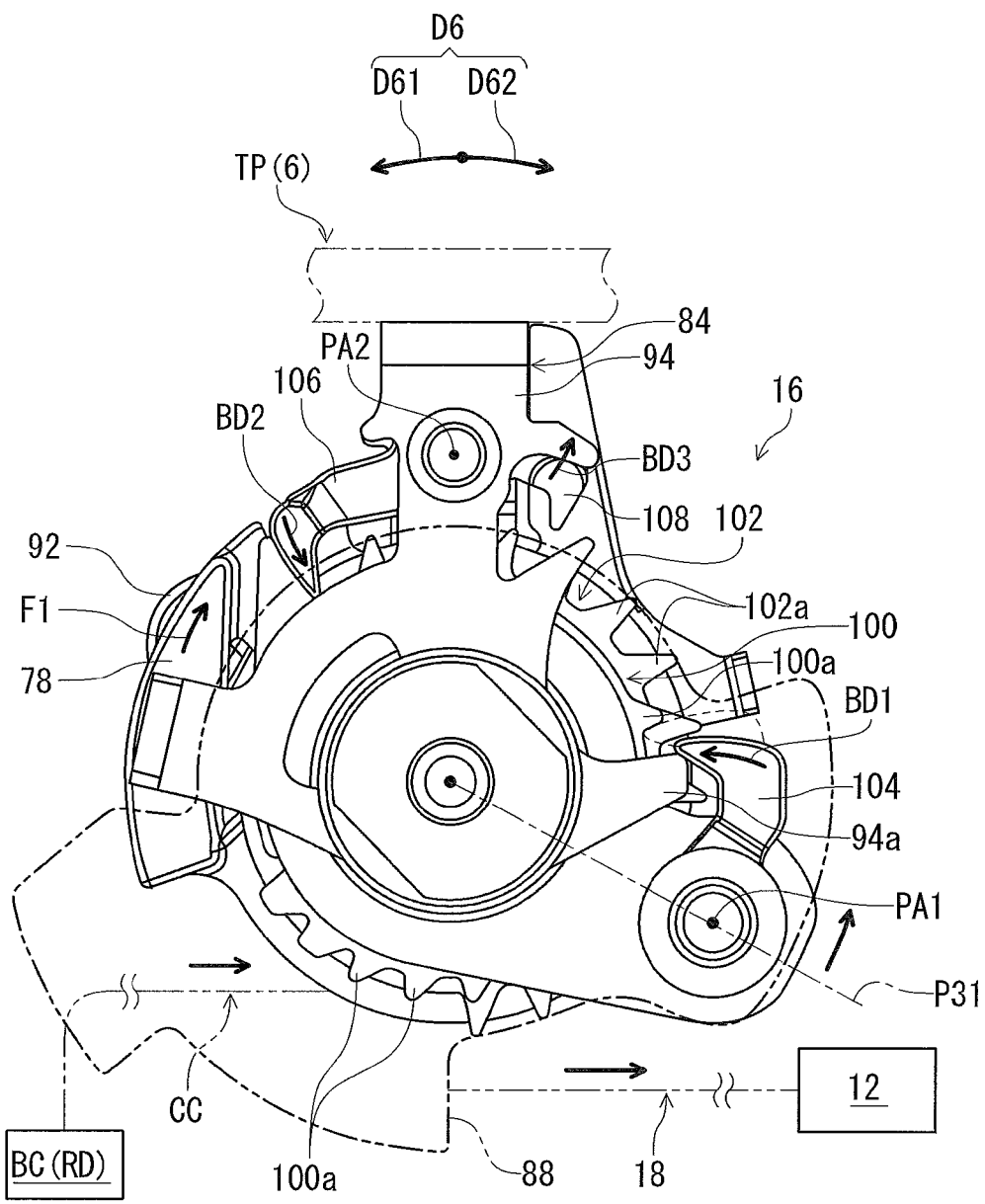
FIG. 16 is a front elevational view of the take-up device for explaining operation of the take-up device illustrated in FIG. 10.

As seen in FIG. 16, the first base member 94 of the base member 84 includes a contact portion 94a. The contact portion 94a is configured to contact the transmitting pawl 104. In a state where the first rotatable member 88 is positioned at a rest position P31, the transmitting pawl 104 is positioned by the contact portion 94a at a position where the transmitting pawl 104 does not engage with the transmitting teeth 100a of the transmitting member 100.

When the first rotatable member 88 is rotated about the rotational axis A1 in the first rotational direction D61, the transmitting pawl 104 moves toward the transmitting teeth 100a of the transmitting member 100 to engage with one of the transmitting teeth 100a. Accordingly, the rotation of the first rotatable member 88 is transmitted to the take-up member 78 via the transmitting member 100 so that the first rotatable member 88 and the take-up member 78 integrally rotate about the rotational axis A1 in the first rotational direction D61. At this time, the positioning pawl 106 is pushes up by one of the positioning teeth 102a, which causes the positioning pawl 106 to engage with adjacent one of the positioning teeth 102a. Accordingly, the control cable CC is pulled (wound) by the take-up member 78 in response to the first operation of the first operating device 12 to move by a length corresponding to one pitch of the positioning teeth 102a.

Namely, the first rotatable member 88 is configured to transmit the first operation of the first operating device 12 to the take-up member 78 to rotate the take-up member 78 relative to the tubular part TP about the rotational axis A1 against the rotational biasing force F1.

As seen in FIG. 12, the ratchet structure 98 includes a positioning pawl 106 configured to selectively maintain the take-up member 78 at the plurality of positions relative to the base member 84 against the rotational biasing force F1. The positioning pawl 106 is pivotable relative to the base member 84 about a second pivot axis PA2. The positioning pawl 106 is configured to selectively engage with the positioning teeth 102a (FIG. 15) of the positioning member 102. The positioning pawl 106 is biased by a second biasing element (not shown) to pivot relative to the base member 84 about the second pivot axis PA2 in a second biasing direction BD2.

As seen in FIG. 12, the second rotatable member 90 includes a first actuating portion 90a configured to move the positioning pawl 106 away from the positioning teeth 102a of the positioning member 102. The first actuating portion 90a is contactable with the positioning pawl 106.

As seen in FIG. 14, the ratchet structure 98 includes a return pawl 108 configured to temporarily position the take-up member 78 at one of the plurality of positions relative to the base member 84 instead of the positioning pawl 106. The return pawl 108 is pivotable relative to the base member 84 about the second pivot axis PA2. The return pawl 108 is biased by a third biasing element (not shown) to pivot relative to the base member 84 about the second pivot axis PA2 in a third biasing direction BD3. The return pawl 108 is biased in the third biasing direction BD3 to move away from the positioning teeth 102a of the positioning member 102.

Figure 17:
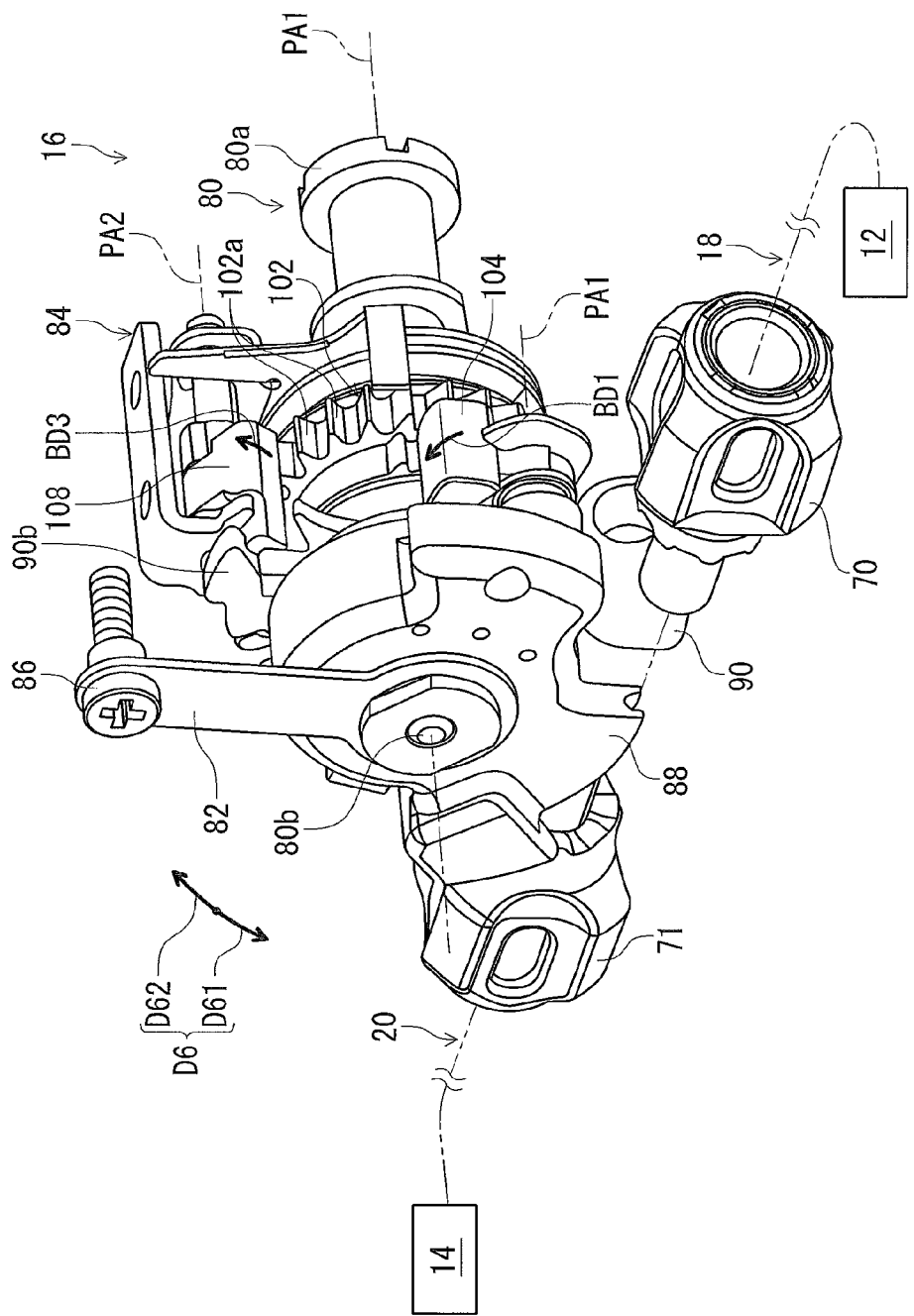
FIG. 17 is a perspective view of the take-up device illustrated in FIG. 10.

As seen in FIG. 17, the second rotatable member 90 includes a second actuating portion 90b configured to move the return pawl 108 toward the positioning teeth 102a of the positioning member 102. The second actuating portion 90b is contactable with the return pawl 108.

Figure 18:
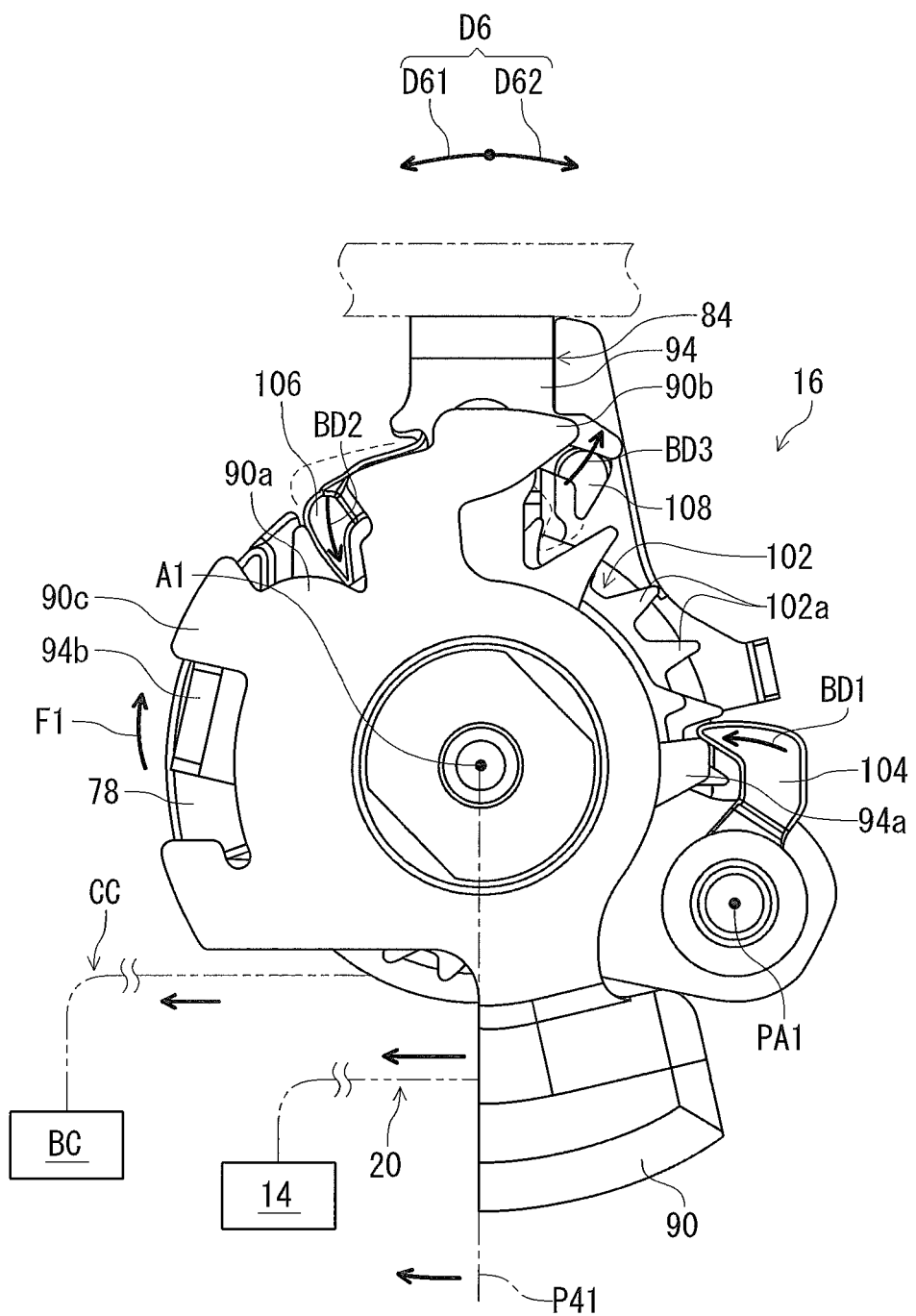
FIG. 18 is a front elevational view of the take-up device for explaining operation of the take-up device illustrated in FIG. 10.

As seen in FIG. 18, when the second rotatable member 90 is rotated in the second rotational direction D62 from a rest position P41, the positioning pawl 106 is pivoted by the first actuating portion 90a in a direction opposite to the second biasing direction BD2. This moves the positioning pawl 106 away from the positioning teeth 102a of the positioning member 102, releasing the engagement between the positioning pawl 106 and one of the positioning teeth 102a. The rest position P41 is defined as a position where a stopper part 90c of the second rotatable member 90 contacts a stopper part 94b of the first base member 94.

Furthermore, when the second rotatable member 90 is rotated in the second rotational direction D62 from the rest position P41, the return pawl 108 is pivoted by the second actuating portion 90b in a direction opposite to the third biasing direction BD3. This moves the return pawl 108 toward the positioning teeth 102a, causing the return pawl 108 to temporarily engage with one of the positioning teeth 102a.

When the second rotatable member 90 is returned to the rest position P41, the return pawl 108 moves away from the positioning teeth 102a of the positioning member 102, and the positioning pawl 106 engages with the positioning teeth 102a of the positioning teeth 102 instead of the return pawl 108. At this time, the rotational biasing force F1 rotates the positioning member 102 and the take-up member 78 about the rotational axis A1 in the second rotational direction D62 by one pitch of the positioning teeth 102a. Accordingly, the control cable CC is released (unwound) by the take-up member 78 in response to the second operation of the second operating device 14 to move by a length corresponding to one pitch of the positioning teeth 102a.

Figure 19:
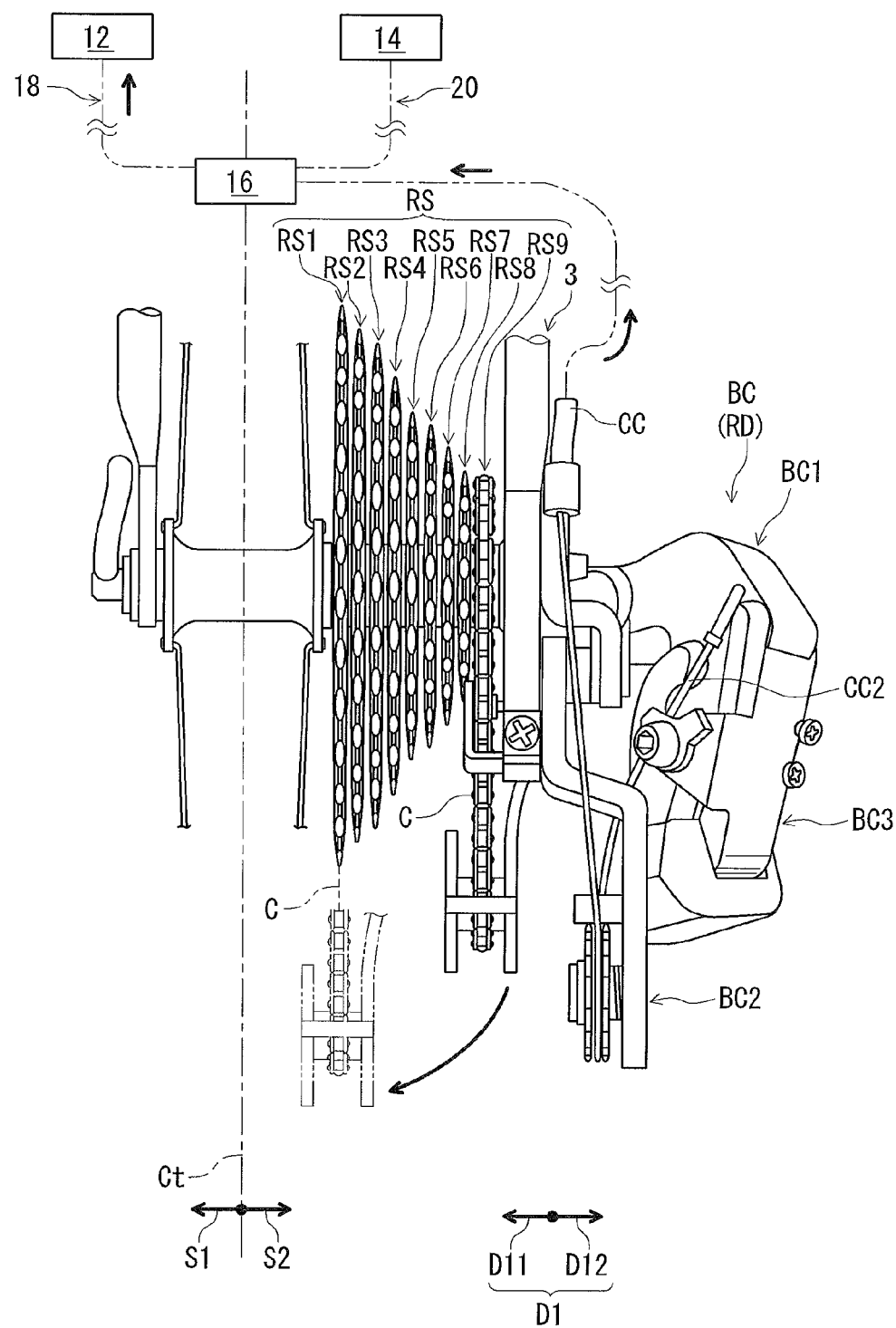
FIG. 19 is a rear elevational view of a rear derailleur of the bicycle illustrated in FIG. 1.
Figure 20:
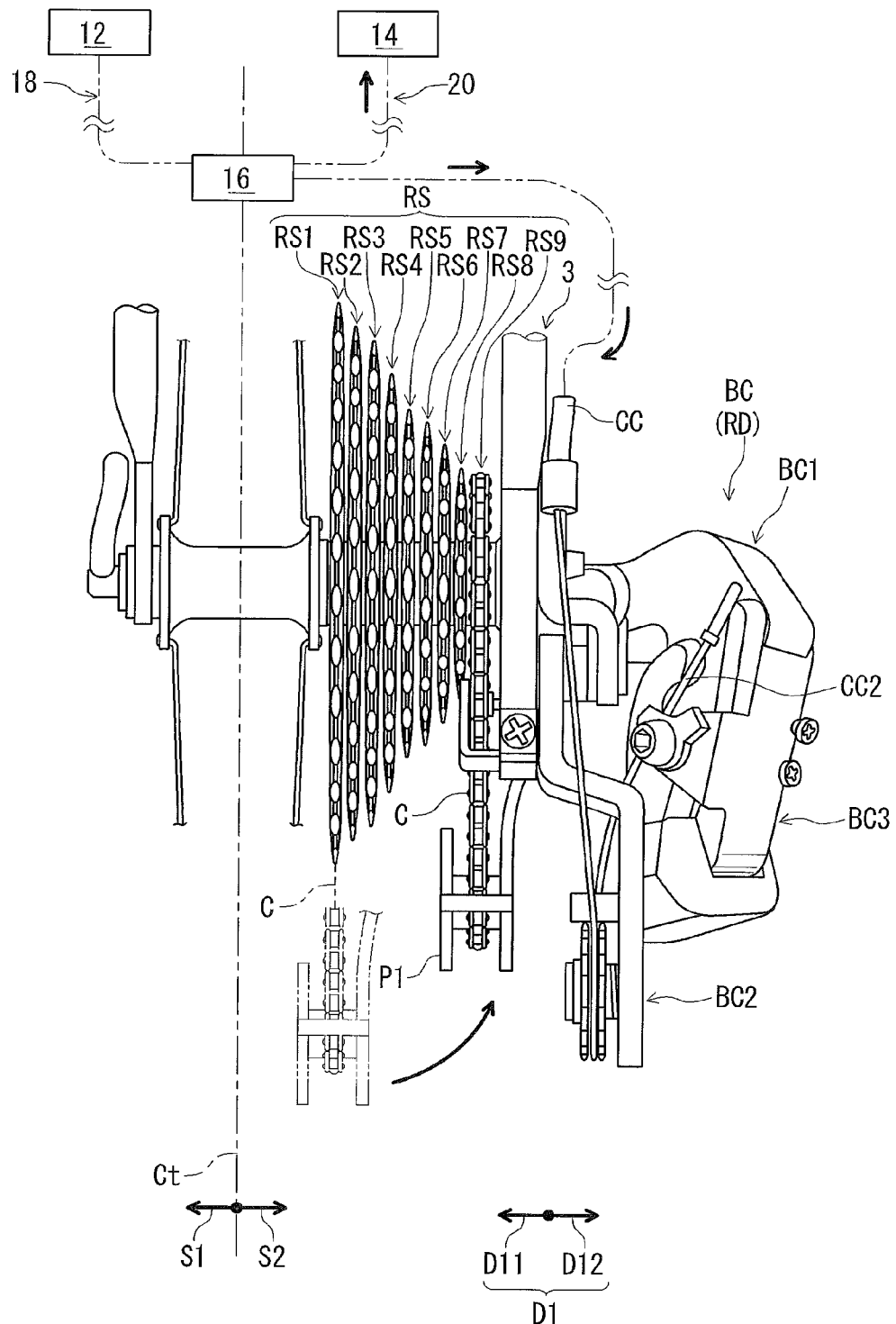
FIG. 20 is a rear elevational view of a rear derailleur of the bicycle illustrated in FIG. 1.

As seen in FIGS. 19 and 20, movement of the control cable CC is transmitted from the take-up device 16 to the rear derailleur RD. The rear derailleur RD is configured to shift the bicycle chain C in the transverse direction D1 to change gears. The rear sprocket assembly RS includes sprockets RS1 to RS9 arranged in the transverse direction D1. The sprocket RS1 corresponds to a low gear, and the sprocket RS9 corresponds to a top gear.

The bicycle component BC (e.g., the rear derailleur RD) includes a base member BC1, a movable member BC2, and a link member BC3. The base member BC1 is configured to be mounted to the bicycle body 2. The movable member BC2 is configured to move with respect to the base member BC1. The link member BC3 movably couples the movable member BC2 to the base member BC1. The second end CC2 of the control cable CC is fixedly connected to the link member BC3. Since the rear derailleur RD and the rear sprocket assembly RS are well known in the bicycle field, they will not be described in detail here for the sake of brevity.

As seen in FIG. 19, the take-up device 16 is configured to move the control cable CC in response to the first operation of the first operating device 12 such that the bicycle chain C is moved in a first transverse direction D11 which directs from the second side S2 to the first side S1. More specifically, the rear derailleur RD is configured to shift the bicycle chain C relative to the rear sprocket assembly RS in the first transverse direction D11 when the control cable CC is pulled by the take-up device 16 in response to the first operation of the first operating device 12.

As seen in FIG. 20, the take-up device 16 is configured to move the control cable CC in response to the second operation of the second operating device 14 such that the bicycle chain C is moved in the second transverse direction D12 opposite to the first transverse direction D11. The first transverse direction D11 and the second transverse direction D12 are included in the transverse direction D1. The rear derailleur RD is configured to shift the bicycle chain C relative to the rear sprocket assembly RS in the second transverse direction D12 when the control cable CC is released by the take-up device 16 in response to the second operation of the second operating device 14.

Namely, when the first operating device 12 disposed on a left side with respect to the transverse center Ct is operated, the bicycle chain C is shifted in a left direction. When the second operating device 14 disposed on a right side with respect to the transverse center Ct is operated, the bicycle chain C is shifted in a right direction.

With the bicycle operating system 10, since the take-up device 16 configured to move the control cable CC connected to the bicycle component BC is provided in the tubular part TP of the bicycle body 2, it is possible to simplify the structure of the first operating device 12.

Furthermore, since the stem 6 in which the take-up device 16 is provided is comparatively close to the handlebar 4 to which the first operating device 12 is mounted, it is possible to shorten the first control element 18. Accordingly, click feeling can be easily transmitted from the take-up device 16 to a rider when the rider operates the first operating device 12.

With the take-up device 16, since the second rotatable member 90 is disposed between the first rotatable member 88 and the take-up member 78, it is possible to make the take-up device 16 more compact.

With the bicycle operating apparatus OA1, since the take-up device 16 is configured to be provided outside the bicycle operating apparatus OA1, it is possible to simplify the structure of the cable operating device CD1 configured to operate the take-up device 16 by moving the first control element 18, which allows the cable operating device CD1 to be easily attached to the hydraulic device HD1.

Similarly, with the bicycle operating apparatus OA2, since the take-up device 16 is configured to be provided outside the bicycle operating apparatus OA2, it is possible to simplify the structure of the cable operating device CD2 configured to operate the take-up device 16 by moving the second control element 20, which allows the cable operating device CD2 to be easily attached to the hydraulic device HD2.

Second Embodiment

A bicycle operating system 210 in accordance with a second embodiment will be described below referring to FIGS. 21 and 22. The bicycle operating system 210 has the same configuration as the bicycle operating system 10 except for the first and second control elements 18 and 20. Thus, elements having substantially the same function as those in the first embodiment will be numbered the same here, and will not be described and/or illustrated again in detail here for the sake of brevity.

Figure 21:
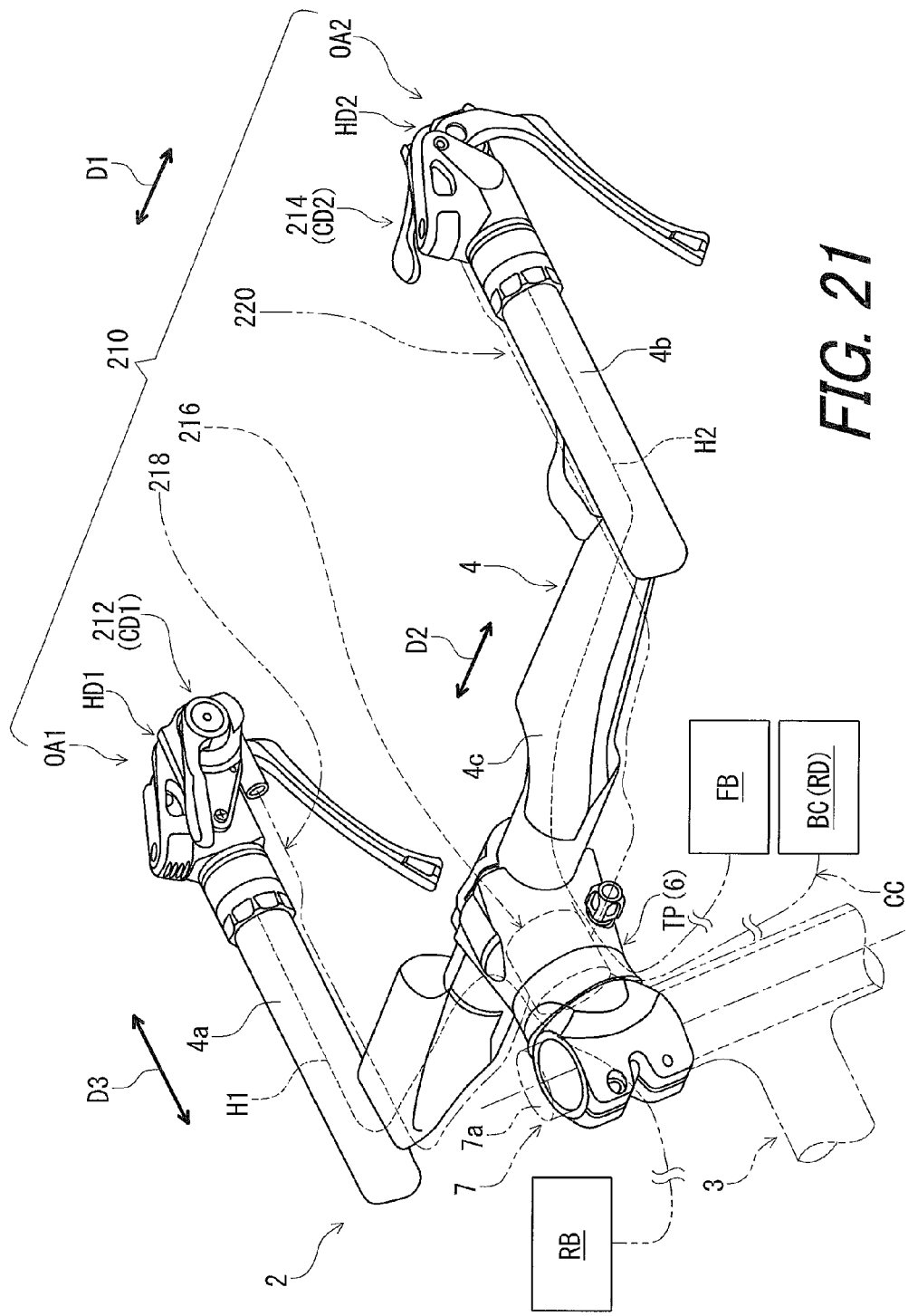
FIG. 21 is a perspective view of a bicycle operating system in accordance with a second embodiment.

As seen in FIG. 21, the bicycle operating system 210 comprises a first operating device 212 and a take-up device 216. The first operating device 212 has substantially the same construction as that of the first operating device 12 of the first embodiment. The take-up device 216 has substantially the same construction as that of the take-up device 16 of the first embodiment. However, the take-up device 216 is operatively coupled to the first operating device 212 via a first control element 218. In the illustrated embodiment, the first control element 218 comprises a signal communication path configured to transmit a signal from the first operating device 212 to the take-up device 216. More specifically, the first control element 218 comprises an electrical cable as the signal communication path. Further, the light guide to transmit an electromagnetic signal (e.g., optical signal) can be the signal communication path.

While the first control element 218 comprises the electrical cable as the signal communication path, the first control element 218 can comprise a wireless communication path configured to wirelessly transmit a signal from the first operating device 212 to the take-up device 216 if needed and/or desired. In such an embodiment, the first operating device 212 can be attached to a bicycle wearable item. Possible examples of the bicycle wearable item include a glove and a wear.

In case of the wireless communication path, for example, the take-up device 216 includes a wireless receiver (not shown). The wireless receiver is preferably disposed on a front side of the take-up device 216 so as to be closer to the first and second operating devices 212 and 214. If the take-up device 216 is disposed inside the tubular part TP, it is preferable that the wireless receiver is disposed outside the tubular part TP independently from other parts of the take-up device 216. In such an embodiment, for example, the wireless receiver is connected to a CPU of the take-up device 216 via a communication line.

Figure 22:
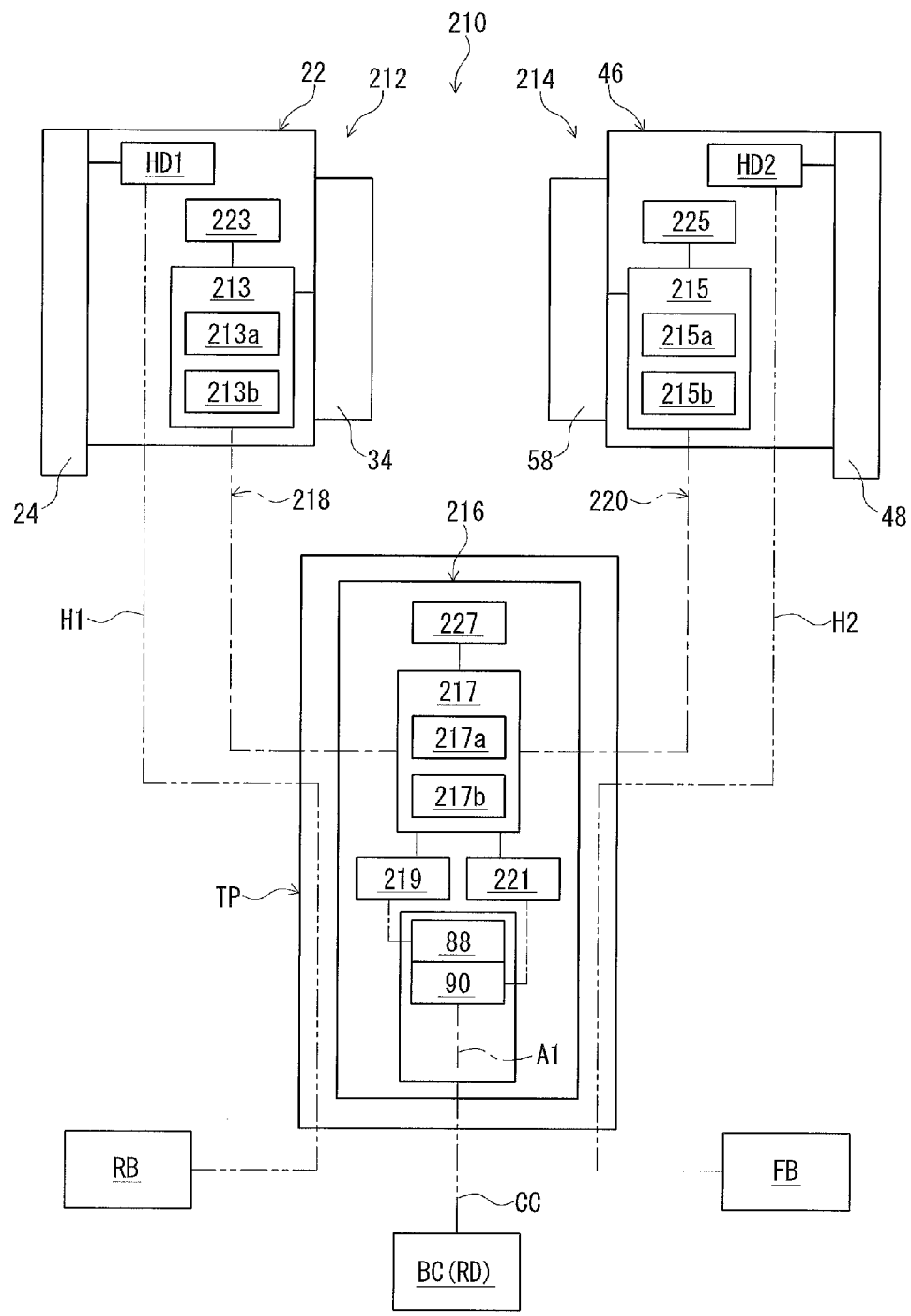
FIG. 22 is a schematic block diagram of the bicycle operating system illustrated in FIG. 21.

As seen in FIG. 22, the first operating device 212 includes a first controller 213 configured to generate the signal in response to the first operation of the operating member 34. For example, the first controller 213 includes an electrical switch (not shown) operatively connected to the operating member 34. The first controller 213 is constituted as a microcomputer and includes a processor 213*a* and a memory 213*b*. The processor 213*a* includes a central processing unit (CPU). The memory 213*b* includes a read only memory (ROM) and a random access memory (RAM). For example, a program stored in the memory 213*b* is read into the processor 213*a*, and thereby several functions of the first controller 213 are performed.

As seen in FIG. 21, the bicycle operating system 210 comprises a second operating device 214. The second operating device 214 has substantially the same construction as that of the second operating device 14 of the first embodiment. However, the take-up device 216 is operatively coupled to the second operating device 214 via a second control element 220. In the illustrated embodiment, the second control element 220 comprises a signal communication path configured to transmit a signal from the second operating device 214 to the take-up device 216. More specifically, the second control element 220 comprises an electrical cable as the signal communication path. Further, the light guide to transmit an electromagnetic signal (e.g., optical signal) can be the signal communication path.

While the second control element 220 comprises the electrical cable as the signal communication path, the second control element 220 can comprise a wireless communication path configured to wirelessly transmit a signal from the second operating device 214 to the take-up device 216 if needed and/or desired. In such an embodiment, the second operating device 214 can be attached to the bicycle wearable item.

As seen in FIG. 22, the second operating device 214 includes a second controller 215 configured to generate the signal in response to the second operation of the operating member 58. For example, the second controller 215 includes an electrical switch (not shown) operatively connected to the operating member 58. The second controller 215 is constituted as a microcomputer and includes a processor 215*a* and a memory 215*b*. The processor 215*a* includes a CPU. The memory 215*b* includes a ROM and a RAM. For example, a program stored in the memory 215*b* is read into the processor 215*a*, and thereby several functions of the second controller 215 are performed.

The take-up device 216 includes a take-up controller 217, a first actuator 219, and a second actuator 221. The take-up controller 217 is electrically connected to the first operating device 212 via the first control element 218. The take-up controller 217 is configured to receive the signal from the first operating device 212 via the first control element 218. The take-up controller 217 is electrically connected to the second operating device 214 via the second control element 220. The take-up controller 217 is configured to receive the signal from the second operating device 214 via the second control element 220.

The take-up controller 217 is constituted as a microcomputer and includes a processor 217*a* and a memory 217*b*. The processor 217*a* includes a CPU. The memory 217*b* includes a ROM and a RAM. For example, a program stored in the memory 217*b* is read into the processor 217*a*, and thereby several functions of the take-up controller 217 are performed.

The first actuator 219 is configured to rotate the first rotatable member 88 relative to the tubular part TP in the first rotational direction D1 (FIG. 12) about the rotational axis A1 by a first rotational angle. The second actuator 221 is configured to rotate the second rotatable member 90 relative to the tubular part TP in the second rotational direction D2 (FIG. 12) about the rotational axis A1 by a second rotational angle. Possible examples of the first and second actuators 219 and 221 include a direct-current motor and a stepper motor.

The take-up controller 217 is configured to control the first actuator 219 in response to a first signal transmitted from the first operating device 212 via the first control element 218. For example, the take-up controller 217 is configured to control the first actuator 219 to rotate the first rotatable member 88 in the first rotational direction D61 (FIG. 12) by the first rotational angle in response to the first signal.

Similarly, the take-up controller 217 is configured to control the second actuator 221 in response to a second signal transmitted from the second operating device 214 via the second control element 220. For example, the take-up controller 217 is configured to control the second actuator 221 to rotate the second rotatable member 90 in the second rotational direction D62 (FIG. 12) by the second rotational angle in response to the second signal.

As seen in FIG. 22, the bicycle operating system 210 includes a first power supply device 223, a second power supply device 225, and a third power supply device 227. The first power supply device 223 is provided in the first operating device 212 and is configured to supply electrical power to the first controller 213. The second power supply device 225 is provided in the second operating device 214 and is configured to supply electrical power to the second controller 215. The third power supply device 227 is configured to supply electrical power to the take-up controller 217, the first actuator 219, and the second actuator 221. Possible examples of the first to third power supply devices 223, 225 and 227 include a battery.

In a case where a power line communication (PLC) is applied to the first and second control elements 218 and 220, the third power supply device 227 can supply electrical power to the first controller 213 and the second controller 215 via the first control element 218 and the second control element 220. In such an embodiment, the first power supply device 223 and the second power supply device 225 can be omitted from the bicycle operating system 210.

When the operating member 34 of the first operating device 212 is operated by a rider, the first signal is generated by the first controller 213. The first signal is transmitted from the first controller 213 to the take-up controller 227 of the take-up device 216 via the first control element 218. The first actuator 219 is controlled by the take-up controller 227 to rotate the first rotatable member 88 based on the first signal. The rotation of the first rotatable member 88 causes the control cable CC to be pulled as described in the first embodiment. Accordingly, the rear derailleur RD shifts the bicycle chain C relative to the rear sprocket assembly RS in the first transverse direction D11 (FIG. 19) when the control cable CC is pulled by the take-up device 216 in response to the first operation of the first operating device 212.

When the operating member 58 of the second operating device 214 is operated by a rider, the second signal is generated by the second controller 215. The second signal is transmitted from the second controller 215 to the take-up controller 227 of the take-up device 216 via the second control element 220. The second actuator 221 is controlled by the take-up controller 227 to rotate the second rotatable member 90 based on the second signal. The rotation of the second rotatable member 90 causes the control cable CC to be released as described in the second embodiment. Accordingly, the rear derailleur RD shifts the bicycle chain C relative to the rear sprocket assembly RS in the second transverse direction D12 (FIG. 20) when the control cable CC is released by the take-up device 216 in response to the second operation of the second operating device 214.

With the bicycle operating system 210, the take-up device 216 configured to move the control cable CC connected to the bicycle component BC is provided in the tubular part TP of the bicycle body 2. Accordingly, it is possible to simplify the structure of the first operating device 212 compared with a case where the take-up device 216 is provided in the first operating device 212. The same can be applied to the second operating device 214.

In the illustrated embodiment, the first actuator 219 and the first rotatable member 88 are provided for pulling the control cable CC, and the second actuator 221 and the second rotatable member 90 are provided for releasing the control cable CC. However, the take-up device 216 can include one actuator and one rotatable member for pulling and releasing the control cable CC if needed and/or desired. In such an embodiment, the actuator is controlled by the take-up controller 217 to rotate the rotatable member in the first and second rotational directions D61 and D62 (FIG. 12) for pulling and releasing the control cable CC.

The location of the take-up device 216 is not limited to the illustrated embodiment. The take-up device 216 can be disposed outside the tubular part TP and can be attached to the bicycle body 2 independently from the first and second operating devices 212 and 214 if needed and/or desired.

Third Embodiment

A bicycle operating system 310 in accordance with a third embodiment will be described below referring to FIGS. 23 and 24. The bicycle operating system 310 has the same configuration as the bicycle operating system 10 except for the first and second control elements 18 and 20. Thus, elements having substantially the same function as those in the first embodiment will be numbered the same here, and will not be described and/or illustrated again in detail here for the sake of brevity.

Figure 23:
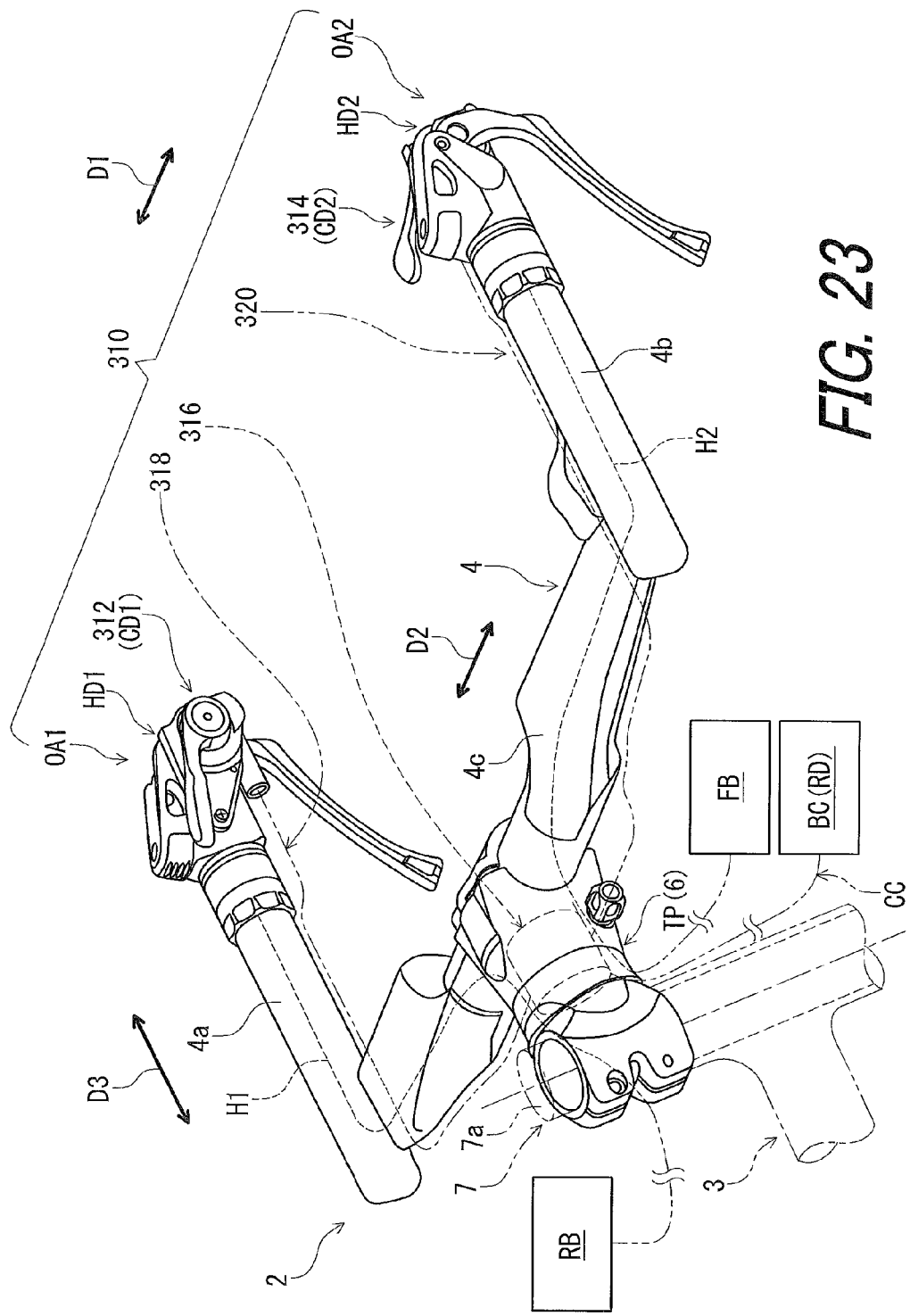
FIG. 23 is a perspective view of a bicycle operating system in accordance with a third embodiment.

As seen in FIG. 23, the bicycle operating system 310 comprises a first operating device 312 and a take-up device 316. The first operating device 312 has substantially the same construction as that of the first operating device 12 in accordance with the first embodiment. The take-up device 316 has substantially the same construction as that of the take-up device 16 in accordance with the first embodiment. However, the take-up device 316 is operatively coupled to the first operating device 312 via a first control element 318. In the illustrated embodiment, the first control element 318 comprises a fluid configured to transmit an operating force from the first operating device 312 to the take-up device 316. Possible examples of the fluid include liquid and gas. In the illustrated embodiment, the first control element 318 comprises a liquid such as a hydraulic oil in the illustrated embodiment. However, the first control element 318 can comprise gas such as air.

Figure 24:
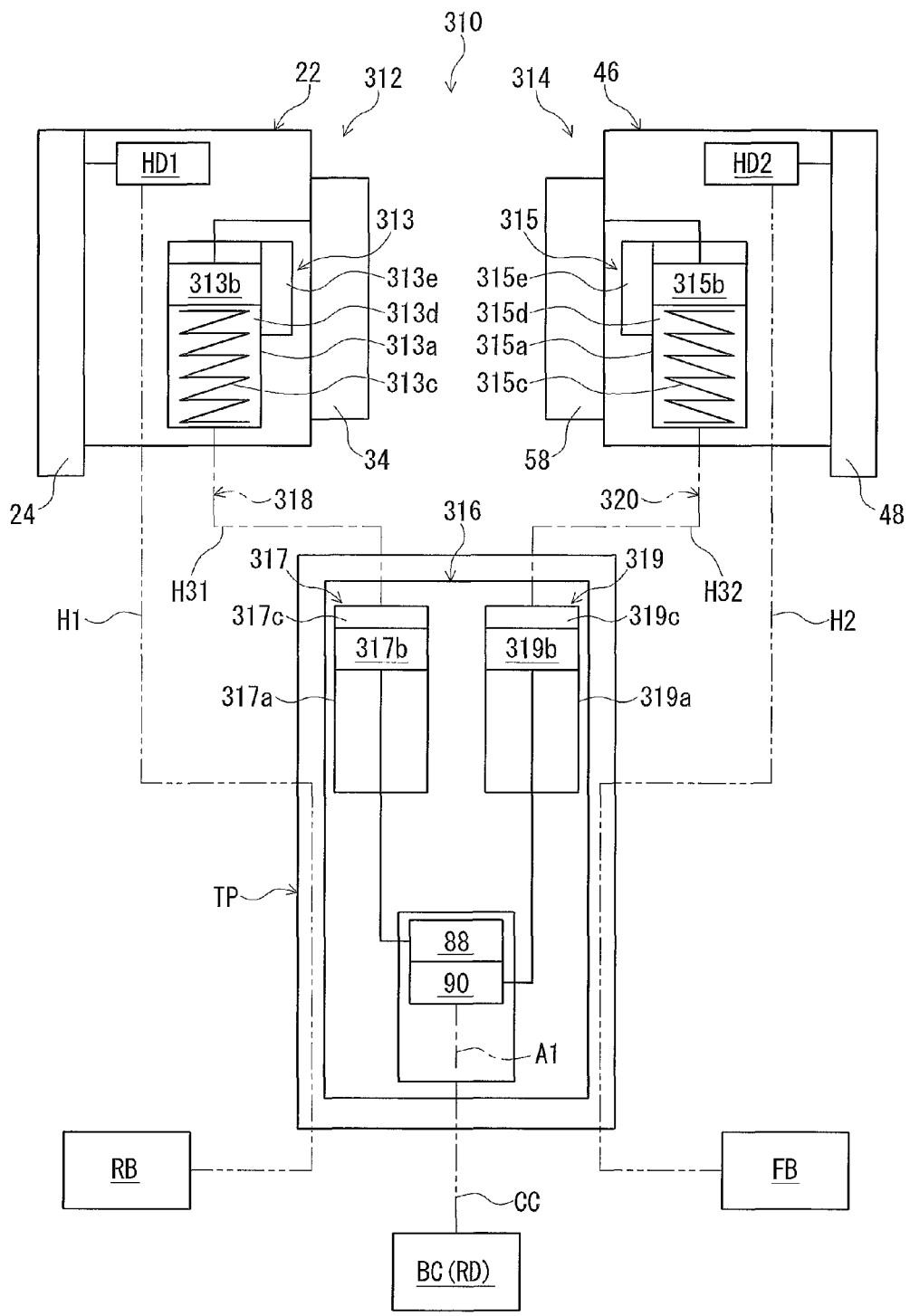
FIG. 24 is a schematic block diagram of the bicycle operating system illustrated in FIG. 23.

As seen in FIG. 24, the first operating device 312 includes a first master hydraulic unit 313 configured to generate the operating force in response to the operating member 34. The first master hydraulic unit 313 includes a first master cylinder 313a, a first master piston 313b, and a first master biasing element 313c. The first master piston 313b is operatively connected to the operating member 34. The first master piston 313b is movable in the first master cylinder 313a in response to pivotal movement of the operating member 34. The first master biasing element 313c is configured to bias the first master piston 313b toward an initial position. A first master chamber 313d is defined by the first master cylinder 313a and the first master piston 313b. The first operating device 312 further includes a first reservoir 313e configured to be in fluid communication with the first master chamber 313c.

As seen in FIG. 24, the take-up device 316 includes a first slave hydraulic unit 317 configured to generate the operating force in response to the operating member 34. The first slave hydraulic unit 317 includes a first slave cylinder 317a and a first slave piston 317b. The first slave piston 317b is movable in the first slave cylinder 317a. A first slave chamber 317c is defined by the first slave cylinder 317a and the first slave piston 317b. The first slave chamber 317c is configured to be in fluid communication with the first master chamber 313d via a first hydraulic hose H31.

The first slave piston 317b is movable in the first slave cylinder 317a in response to a hydraulic pressure transmitted from the first master hydraulic unit 313 of the first operating device 312. The first slave piston 317b is operatively connected to the first rotatable member 88.

The pivotal movement of the operating member 34 relative to the bracket 22 moves the first master piston 313b relative to the first master cylinder 313a against a biasing force of the first master biasing element 313c. This increases a hydraulic pressure in the first master chamber 313d, the first hydraulic hose H31 and the first slave chamber 317c, causing the first slave piston 317b to move relative to the first slave cylinder 317a. The movement of the first slave piston 317b rotates the first rotatable member 88 about the rotational axis A1 in the first rotational direction D61, causing the control cable CC to be pulled by the take-up device 316. Accordingly, the rear derailleur RD shifts the bicycle chain C relative to the rear sprocket assembly RS in the first transverse direction D11 (FIG. 19) when the control cable CC is pulled by the take-up device 316 in response to the first operation of the first operating device 312.

As seen in FIG. 23, the bicycle operating system 310 further comprises a second operating device 314. The second operating device 314 has substantially the same construction as that of the second operating device 14 in accordance with the second embodiment. However, the take-up device 316 is operatively coupled to the second operating device 314 via a second control element 320. In the illustrated embodiment, the second control element 320 comprises a fluid configured to transmit an operating force from the second operating device 314 to the take-up device 316. Possible examples of the fluid include liquid and gas. In the illustrated embodiment, the second control element 320 comprises a liquid such as a hydraulic oil in the illustrated embodiment. However, the second control element 320 can comprise gas such as air.

As seen in FIG. 24, the second operating device 314 includes a second master hydraulic unit 315 configured to generate the operating force in response to the operating member 34. The second master hydraulic unit 315 includes a second master cylinder 315a, a second master piston 315b, and a second master biasing element 315c. The second master piston 315b is operatively connected to the operating member 34. The second master piston 315b is movable in the second master cylinder 315a in response to pivotal movement of the operating member 34. The second master biasing element 315c is configured to bias the second master piston 315b toward an initial position. A second master chamber 315d is defined by the second master cylinder 315a and the second master piston 315b. The second operating device 314 further includes a second reservoir 315e configured to be in fluid communication with the second master chamber 315d.

As seen in FIG. 24, the take-up device 316 includes a second slave hydraulic unit 319 configured to generate the operating force in response to the operating member 34. The second slave hydraulic unit 319 includes a second slave cylinder 319a and a second slave piston 319b. The second slave piston 319b is movable in the second slave cylinder 319a. A second slave chamber 319c is defined by the second slave cylinder 319a and the second slave piston 319b. The second slave chamber 319c is configured to be in fluid communication with the second master chamber 315d via a second hydraulic hose H32.

The second slave piston 319b is movable in the second slave cylinder 319a in response to a hydraulic pressure transmitted from the second master hydraulic unit 315 of the second operating device 314. The second slave piston 319b is operatively connected to the second rotatable member 90.

The pivotal movement of the operating member 58 relative to the bracket 46 moves the second master piston 315b relative to the second master cylinder 315a against a biasing force of the second master biasing element 315c. This increases a hydraulic pressure in the second master chamber 315d, the second hydraulic hose H32 and the second slave chamber 319c, causing the second slave piston 319b to move relative to the second slave cylinder 319a. The movement of the second slave piston 319b rotates the second rotatable member 90 about the rotational axis A1 in the second rotational direction D61, causing the control cable CC to be released by the take-up device 316. Accordingly, the rear derailleur RD shifts the bicycle chain C relative to the rear sprocket assembly RS in the second transverse direction D12 (FIG. 20) when the control cable CC is released by the take-up device 316 in response to the second operation of the second operating device 314.

With the bicycle operating system 310, the take-up device 316 configured to move the control cable CC connected to the bicycle component BC is provided in the tubular part TP of the bicycle body 2. Accordingly, it is possible to simplify the structure of the first operating device 312 compared with a case where the take-up device 316 is provided in the first operating device 312. The same can be applied to the second operating device 314.

The location of the take-up device 316 is not limited to the illustrated embodiment. The take-up device 316 can be disposed outside the tubular part TP and can be attached to the bicycle body 2 independently from the first and second operating devices 312 and 314 if needed and/or desired.

Fourth Embodiment

A bicycle operating system 410 in accordance with a fourth embodiment will be described below referring to FIGS. 25 to 27. The bicycle operating system 410 has the same configuration as the bicycle operating system 10 except for the take-up device 16. Thus, elements having substantially the same function as those in the first embodiment will be numbered the same here, and will not be described and/or illustrated again in detail here for the sake of brevity.

Figure 25:
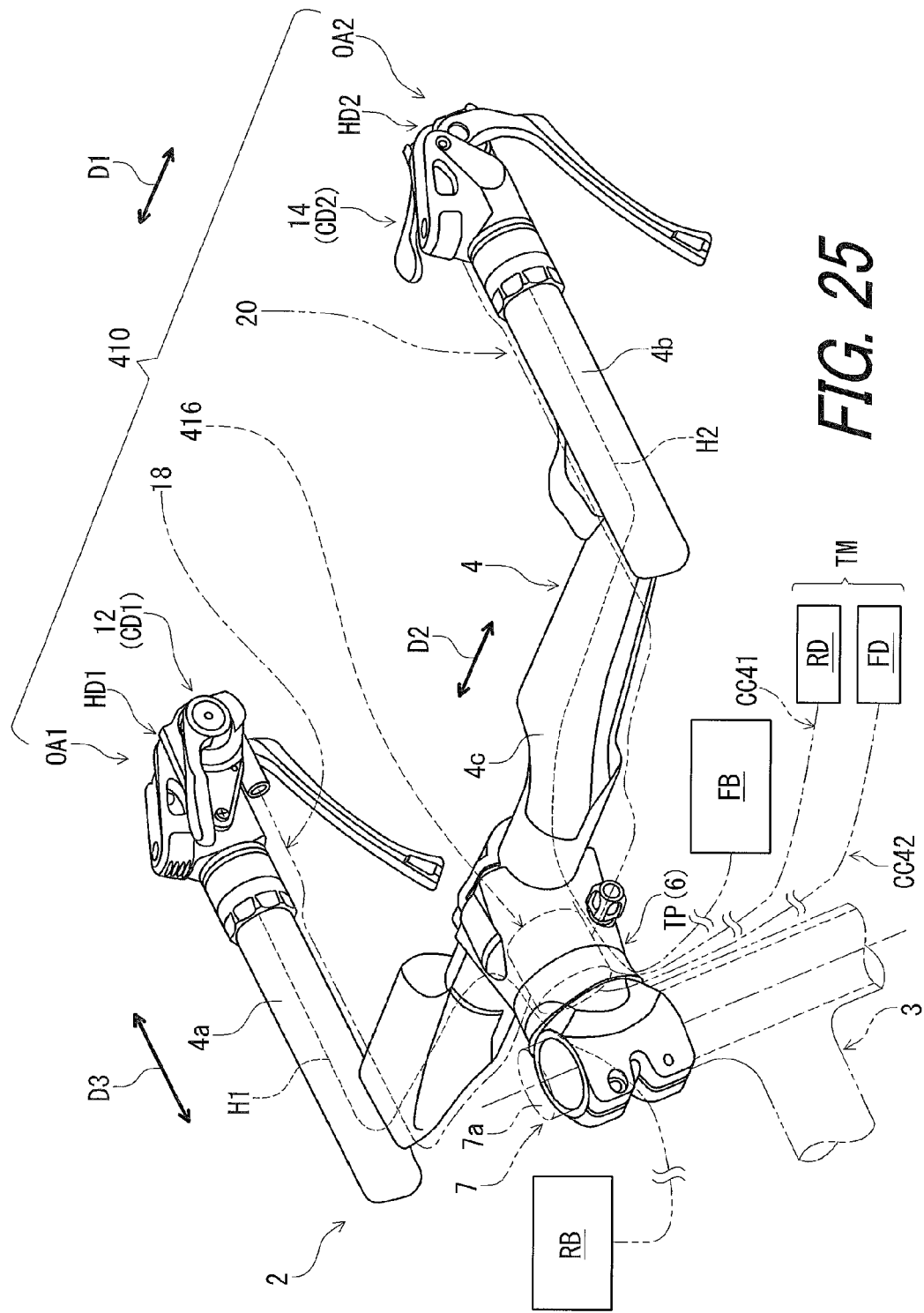
FIG. 25 is a perspective view of a bicycle operating system in accordance with a fourth embodiment.

As seen in FIG. 25, the bicycle operating system 410 comprises the first operating device 12, the second operating device 14, and a take-up device 416. The take-up device 416 has substantially the same construction as that of the take-up device 16 of the first embodiment. However, the take-up device 416 is configured to be operatively connected to a first transmission device via a first control cable CC41 and is configured to be operatively connected to a second transmission device via a second control cable CC42. In the illustrated embodiment, the take-up device 416 is configured to be operatively connected to the rear derailleur RD via the first control cable CC41 and is configured to be operatively connected to a front derailleur FD via the second control cable CC42. The rear derailleur RD can be also referred to as the first transmission device RD. The front derailleur FD can be also referred to as the second transmission device FD. The first transmission device RD and the second transmission device FD constitute a transmission apparatus TM. The take-up device 416 is operatively coupled to the first operating device 12 via the first control element 18. The take-up device 416 is operatively coupled to the second operating device 14 via the second control element 20.

The take-up device 416 is configured to control a speed stage of the first transmission device RD and a speed stage of the second transmission device FD in response to the first operation of the first operating device 12. The take-up device 416 is configured to control the speed stage of the first transmission device RD and the speed stage of the second transmission device FD in response to the second operation of the second operating device 14. For example, the first operation of the first operating device 12 is an upshift operation for the transmission apparatus TM, and the second operation of the second operating device 14 is a downshift operation for the transmission apparatus TM.

FIG. 26 shows one example of a shift table including gear ratios, a total number of teeth of each sprocket element in a chain wheel ("FS"), and a total number of teeth of each sprocket element in the rear sprocket RS ("RS"). In the illustrated embodiment, as seen in FIG. 26, the first transmission device RD has low and top gears as the speed stage. The second transmission device FD has first to ninth gears as the speed stage. The take-up device 416 is configured to shift the speed stage of the first transmission device RD and the speed stage of the second transmission device FD in accordance with a transmission route R1 illustrated on the shift table of FIG. 26. Namely, the transmission apparatus TM has eleven speed stages in the illustrated embodiment.

The transmission route R1 includes a first synchro-shift point SS1 and a second synchro-shift point SS2 which are each circled with a single circle. In the illustrated embodiment, at the first synchro-shift point SS1, the take-up device 416 downshifts the first transmission device RD and upshifts the second transmission device FD in response to the first operation (the upshift operation) of the first operating device 12. At the second synchro-shift point SS2, the take-up device 416 upshifts the first transmission device RD and downshifts the second transmission device FD in response to the second operation (the downshift operation) of the second operating device 14.

As seen in FIG. 26, in low gear of the second transmission device FD, the take-up device 416 upshifts the first transmission device RD and keeps the current speed stage of the second transmission device FD in response to the first operation (the upshift operation) of the first operating device 12 from first gear to fifth gears. In low gear of the second transmission device FD, the take-up device 416 downshifts the first transmission device RD and keeps the current speed stage of the second transmission device FD in response to the second operation (the downshift operation) of the second operating device 14 from fifth gear to first gear.

As seen in FIG. 26, in top gear of the second transmission device FD, the take-up device 416 upshifts the first transmission device RD and keeps the current speed stage of the second transmission device FD in response to the first operation (the upshift operation) of the first operating device 12 from fourth gear to ninth gears. In top gear of the second transmission device FD, the take-up device 416 downshifts the first transmission device RD and keeps the current speed stage of the second transmission device FD in response to the second operation (the downshift operation) of the second operating device 14 from ninth gear to fourth gear.

Figure 27:
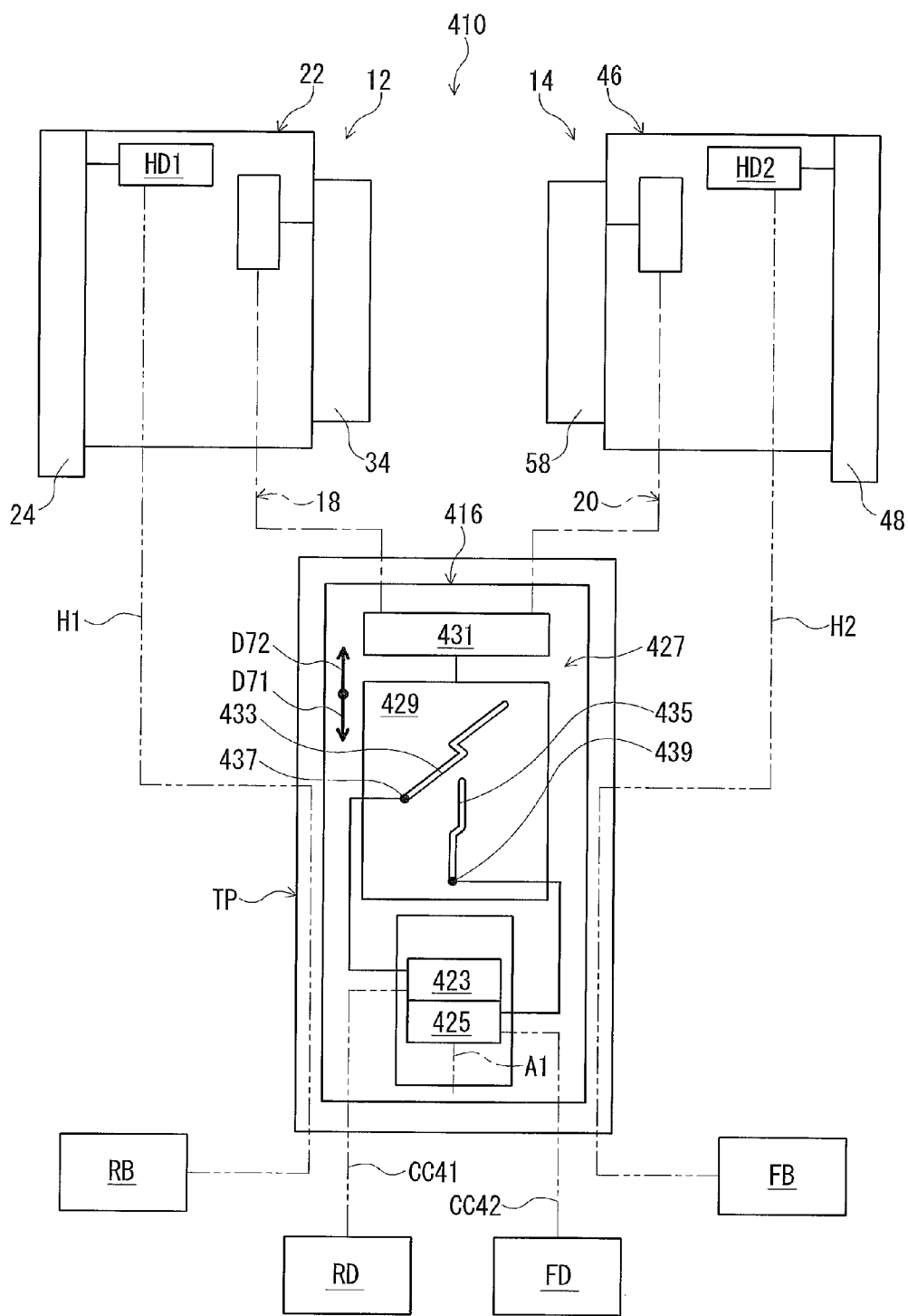
FIG. 27 is a schematic block diagram of the bicycle operating system illustrated in FIG. 25.

As seen in FIG. 27, instead of the take-up member 78 in the first embodiment, the take-up device 416 includes a first take-up member 423 and a second take-up member 425. The first take-up member 423 is configured to move the first control cable CC41. The second take-up member 425 is configured to move the second control cable CC42. The first take-up member 423 and the second take-up member 425 are configured to be provided in the tubular part TP as a single unit. However, the first take-up member 423 and the second take-up member 425 can be provided in the tubular part TP as separate units if needed and/or desired.

The first take-up member 423 is configured to pull and release (wind and unwind) the first control cable CC41. The second take-up member 425 is configured to pull and release (wind and unwind) the second control cable CC42. In the illustrated embodiment, the first take-up member 423 and the second take-up member 425 are rotatable about the rotational axis A1. Since the first take-up member 423 and the second take-up member 425 have substantially the same constructions as that of the take-up member 78 of the first embodiment, they will not be described and/or illustrated in detail here for the sake of brevity.

In the illustrated embodiment, the first take-up member 423 and the second take-up member 425 are configured to move independently of each other in response to the first operation of the first operating device 12. The first take-up member 423 and the second take-up member 425 are configured to move simultaneously in response to the first operation of the first operating device 12. Similarly, the first take-up member 423 and the second take-up member 425 are configured to move independently of each other in response to the second operation of the second operating device 14. The first take-up member 423 and the second take-up member 425 are configured to move simultaneously in response to the second operation of the second operating device 14.

As seen in FIG. 27, the take-up device 416 includes a positioning unit 427 configured to position the first take-up member 423 and the second take-up member 425 in accordance with the transmission route R1 (FIG. 26). More specifically, the positioning unit 427 includes a guide member 429 and an actuating structure 431.

The guide member 429 is movable along the rotational axis A1 relative to the first take-up member 423 and the second take-up member 425. The guide member 429 includes a first guide groove 433 and a second guide groove 435. The first take-up member 423 include a first cam follower 437 provided in the first guide groove 433. The second take-up member 425 includes a second cam follower 439 provided in the second guide groove 435.

The first guide groove 433 is configured to guide the first cam follower 437 so that the first take-up member 423 pulls and releases the first control cable CC41 in accordance with the transmission route R1 (FIG. 26). The second guide groove 435 is configured to guide the second cam follower 439 so that the second take-up member 425 pulls and releases the second control cable CC42 in accordance with the transmission route R1 (FIG. 26).

As seen in FIG. 27, the actuating structure 431 is configured to move the guide member 429 along the rotational axis A1 in response to the first operation of the first operating device 12 and the second operation of the second operating device 14. The actuating structure 431 is operatively connected to the first operating device 12 and the second operating device 14 via the first control element 18 and the second control element 20, respectively. Each of the first control element 18 and the second control element 20 can comprise one of the mechanical control cable, the signal communication path, the fluid, and the light guide.

The actuating structure 431 is configured to selectively position the guide member 429 at thirteenth positions which are equally spaced at a predetermined distance along the rotational axis A1. The actuating structure 431 is configured to move the guide member 429 in a first axial direction D71 in response to the first operation of the first operating device 12 by each predetermined distance. The actuating structure 431 is configured to move the guide member 429 in a second axial direction D72 in response to the second operation of the second operating device 14 by each predetermined distance.

The pivotal movement of the operating member 34 pulls the first control element 18, causing the first operation to be transmitted from the first operating device 12 to the actuating structure 431 of the positioning unit 427 via the first control element 18. The guide member 429 is moved by the actuating structure 431 relative to the first and second take-up members 423 and 425 in the first axial direction D71 by the predetermined distance. This causes the first take-up member 423 to be guided by the guide member 429 along the first guide groove 433 and causes the second take-up member 425 to be guided by the guide member 429 along the second guide groove 435. Thus, the first control cable CC41 and the second control cable CC42 are operated so that the first transmission device RD and the second transmission device FD shifts the speed stages in accordance with the transmission route R1.

The pivotal movement of the operating member 58 pulls the second control element 20, causing the second operation to be transmitted from the second operating device 14 to the actuating structure 431 of the positioning unit 427 via the second control element 20. The guide member 429 is moved by the actuating structure 431 relative to the first and second take-up members 423 and 425 in the second axial direction D72 by the predetermined distance. This causes the first take-up member 423 to be guided by the guide member 429 along the first guide groove 433 and causes the second take-up member 425 to be guided by the guide member 429 along the second guide groove 435. Thus, the first control cable CC41 and the second control cable CC42 are operated so that the first transmission device RD and the second transmission device FD shifts the speed stages in accordance with the transmission route R1.

With the bicycle operating system 410, since the take-up device 416 is provided in the tubular part TP of the bicycle body 2, it is possible to simplify the structure of the first operating device 12 compared with a case where the take-up device 416 is provided in the first operating device 12. The same can be applied to the second operating device 14.

Furthermore, the take-up device 416 is configured to be operatively connected to the first transmission device RD via the first control cable CC41 and is configured to be operatively connected to the second transmission device FD via the second control cable CC42. Accordingly, it is possible to operate the first transmission device RD and the second transmission device FD in response to a single operation of the first operating device 12 or the second operating device 14. This can simplify the shift operation of the first and second operating devices 12 and 14 for the first and second transmission devices RD and FD.

The location of the take-up device 416 is not limited to the illustrated embodiment. The take-up device 416 can be disposed outside the tubular part TP and can be attached to the bicycle body 2 independently from the first and second operating devices 12 and 14 if needed and/or desired.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle operating system comprising:
    a first operating device; and
    a take-up device configured to be provided in a tubular part of a bicycle body, the take-up device being configured to move a control cable configured to be connected to a bicycle component, the take-up device being operatively coupled to the first operating device, the take-up device including a take-up member configured to be rotatable relative to the tubular part of the bicycle body, the first operating device and the take-up device being configured to be mounted to the bicycle body independently of each other.

2. The bicycle operating system according to claim 1, further comprising:
    a first control element, wherein
    the take-up device is operatively coupled to the first operating device via the first control element.

3. The bicycle operating system according to claim 2, further comprising:
    a first cable holder configured to hold an outer casing of the first control element, wherein
    the first cable holder is configured to be mounted to a periphery of the tubular part.

4. The bicycle operating system according to claim 2, wherein
    the first control element comprises a mechanical control cable configured to transmit an operating force from the first operating device to the take-up device.

5. The bicycle operating system according to claim 2, wherein
    the first control element comprises a signal communication path configured to transmit a signal from the first operating device to the take-up device.

6. The bicycle operating system according to claim 2, wherein
    the first control element comprises a fluid configured to transmit an operating force from the first operating device to the take-up device.

7. The bicycle operating system according to claim 1, wherein
    the take-up device is configured to be operatively connected to a first transmission device via a first control cable and is configured to be operatively connected to a second transmission device via a second control cable, and
    the take-up device is configured to control a speed stage of the first transmission device and a speed stage of the second transmission device in response to a first operation of the first operating device.

8. The bicycle operating system according to claim 7, wherein
    the take-up member includes:
        a first take-up member configured to move the first control cable; and
        a second take-up member configured to move the second control cable, and
    the first take-up member and the second take-up member are configured to move independently of each other in response to the first operation of the first operating device.

9. The bicycle operating system according to claim 8, wherein
    the first take-up member and the second take-up member are configured to move simultaneously in response to the first operation of the first operating device.

10. The bicycle operating system according to claim 8, wherein the first take-up member and the second take-up member are configured to be provided in the tubular part as a single unit.

11. The bicycle operating system according to claim 1, wherein
the take-up device is configured to be provided in a stem of the tubular part that couples a handlebar to a steering column.

12. The bicycle operating system according to claim 11, wherein
the stem includes:
a first attachment portion configured to be attached to the handlebar; and
a second attachment portion configured to be attached to the steering column, and
the take-up device is configured to be provided between the first attachment portion and the second attachment portion.

13. A bicycle operating system comprising:
a first operating device;
a take-up device configured to be provided in a tubular part of a bicycle body, the take-up device being configured to move a control cable configured to be connected to a bicycle component, the take-up device being operatively coupled to the first operating device via a first control element; and
a second operating device,
the take-up device being operatively coupled to the second operating device via a second control element,
the take-up device being configured to move the control cable relative to the tubular part in response to a first operation of the first operating device, and
the take-up device being configured to move the control cable relative to the tubular part in response to a second operation of the second operating device.

14. The bicycle operating system according to claim 13, wherein
the second operating device is a separate device from the first operating device.

15. The bicycle operating system according to claim 13, wherein
the first operating device, the second operating device and the take-up device are configured to be mounted to the bicycle body independently of each other.

16. The bicycle operating system according to claim 13, wherein
the first operating device is configured to be disposed on a first side with respect to a transverse center of the bicycle body, and
the second operating device is configured to be disposed on a second side with respect to the transverse center of the bicycle body, the second side being opposite to the first side with respect to the transverse center of the bicycle body.

17. The bicycle operating system according to claim 13, wherein
the first operating device is configured to be mounted to a first part of a handlebar,
the second operating device is configured to be mounted to a second part of the handlebar, and
the second part is opposite to the first part with respect to a transverse center of the bicycle body.

18. The bicycle operating system according to claim 13, wherein
the take-up device is configured to pull the control cable in response to the first operation of the first operating device, and
the take-up device is configured to release the control cable in response to the second operation of the second operating device.

19. The bicycle operating system according to claim 13, wherein
the take-up device includes a take-up member configured to be rotatable relative to the tubular part about a rotational axis to pull and release the control cable, and
the take-up member is configured to be provided in the tubular part.

20. The bicycle operating system according to claim 19, wherein
the take-up device includes a first rotatable member configured to be rotatable relative to the tubular part about the rotational axis, the take-up member being configured to pull the control cable in response to rotation of the first rotatable member,
the first rotatable member is configured to be provided in the tubular part, and
the first rotatable member is operatively coupled to the first operating device via the first control element to rotate relative to the tubular part about the rotational axis in response to the first operation of the first operating device.

21. The bicycle operating system according to claim 20, wherein
the take-up device includes a second rotatable member configured to be rotatable relative to the tubular part about the rotational axis, the take-up member being configured to release the control cable in response to rotation of the second rotatable member,
the second rotatable member is configured to be provided in the tubular part, and
the second rotatable member is operatively coupled to the second operating device via the second control element to rotate relative to the tubular part about the rotational axis in response to the second operation of the second operating device.

22. The bicycle operating system according to claim 21, wherein
the first rotatable member and the second rotatable member are aligned with the take-up member inside the tubular part such that the rotational axis extends in a longitudinal direction of the tubular part.

23. The bicycle operating system according to claim 21, wherein
the take-up device includes:
a biasing member configured to be provided in the tubular part and configured to bias the take-up member in a rotational direction of the take-up member; and
a ratchet structure configured to be provided in the tubular part and configured to position the take-up member relative to the tubular part against a rotational biasing force of the biasing member.

24. The bicycle operating system according to claim 23, wherein
the first rotatable member is configured to transmit the first operation of the first operating device to the take-up member to rotate the take-up member relative to the tubular part about the rotational axis against the rotational biasing force, and
the ratchet structure is configured to selectively maintain the take-up member at a plurality of positions relative to the tubular part.

25. The bicycle operating system according to claim 13, wherein the first operating device is configured to be disposed on a first side with respect to a transverse center of the bicycle body, the second operating device is configured to be disposed on a second side with respect to the transverse center of the bicycle body, the take-up device is configured to move the control cable in response to the first operation of the first operating device such that a bicycle chain is moved in a first transverse direction which directs from the second side to the first side, and the take-up device is configured to move the control cable in response to the second operation of the second operating device such that the bicycle chain is moved in a second transverse direction opposite to the first transverse direction.

26. A take-up device comprising:

a take-up member rotatable about a rotational axis to pull and release a control cable configured to be connected to a bicycle component;

a first rotatable member rotatable about the rotational axis in response to a first operation of a first operating device, the take-up member being configured to pull the control cable in response to rotation of the first rotatable member having a first rotational direction; and a second rotatable member rotatable relative to the take-up member and the first rotatable member about the rotational axis in response to a second operation of a second operating device, the take-up member being configured to release the control cable in response to rotation of the second rotatable member having a second rotational direction opposite to the first rotational direction of the rotation of the first rotatable member, the second rotatable member being disposed between the first rotatable member and the take-up member.

27. The take-up device according to claim 26, wherein the take-up member is configured to rotate about the rotational axis in the first rotational direction in response to the rotation of the first rotatable member having the first rotational direction, and the take-up member is configured to rotate about the rotational axis in the second rotational direction in response to the rotation of the second rotatable member having the second rotational direction opposite to the first rotational direction.

28. A bicycle operating apparatus comprising:

a hydraulic device configured to be mounted to a bicycle body; and a cable operating device configured to be operatively coupled to a take-up device provided outside the bicycle operating apparatus to move a control cable configured to be connected to a bicycle component, the cable operating device being configured to attach to the hydraulic device, the cable operating device being a separate device from the take-up device.

29. The bicycle operating apparatus according to claim 28, wherein the hydraulic device includes:
    a bracket including a gripping portion configured to be gripped by a rider;
    a hydraulic cylinder;
    a piston disposed within the hydraulic cylinder and movable between an initial position and an actuated position; and
    an operating member movably mounted to the bracket and operatively coupled to the piston to move the piston in response to movement of the operating member, wherein
the cable operating device is attached to the bracket.

30. The bicycle operating apparatus according to claim 29, wherein the cable operating device is detachably attached to the bracket.

31. A bicycle operating system comprising:

a first operating device;

a second operating device provided as a separate device from the first operating device; and a take-up device configured to be mounted to a bicycle body independently of the first operating device and the second operating device, the take-up device being configured to be connected to a first end of a control cable, a second end of the control cable being fixedly connected to a bicycle component, the take-up device being operatively coupled to the first operating device via a first control element so as to move the control cable in a first direction in response to a first operation of the first operating device, the take-up device being operatively coupled to the second operating device via a second control element so as to move the control cable in a second direction different from the first direction in response to a second operation of the second operating device, the first control element comprising one of a first mechanical control cable, a first signal communication path and a first liquid, the second control element comprising one of a second mechanical control cable, a second signal communication path and a second liquid.

32. The bicycle operating system according to claim 31, wherein the take-up device includes a take-up member configured to move in the first direction and the second direction so as to change a length of the control cable between the take-up device and the bicycle component.

33. The bicycle operating system according to claim 31, wherein the first operating device, the second operating device and the take-up device are configured to be mounted to the bicycle body independently of each other.

34. The bicycle operating system according to claim 33, wherein the first operating device is configured to be disposed on a first side with respect to a transverse center of the bicycle body, and the second operating device is configured to be disposed on a second side with respect to the transverse center of the bicycle body, the second side being opposite to the first side with respect to the transverse center of the bicycle body.

35. The bicycle operating system according to claim 31, wherein the first operating device is configured to be mounted to a first part of a handlebar, the second operating device is configured to be mounted to a second part of the handlebar, and the second part is opposite to the first part with respect to a transverse center of the bicycle body.

36. The bicycle operating system according to claim 31, wherein the take-up device is configured to be operatively connected to a first transmission device via a first control cable and is configured to be operatively connected to a second transmission device via a second control cable, and the take-up device is configured to control a gear position of the first transmission device and a gear position of the second transmission device in response to a first operation of the first operating device.

37. The bicycle operating system according to claim 36, wherein the take-up device includes:
a first take-up member configured to move the first control cable; and
a second take-up member configured to move the second control cable, and the first take-up member and the second take-up member are configured to move independently of each other in response to the first operation of the first operating device.

38. The bicycle operating system according to claim 37, wherein the first take-up member and the second take-up member are configured to move simultaneously in response to the first operation of the first operating device.

39. The bicycle operating system according to claim 36, wherein the first take-up member and the second take-up member are provided as a single unit.

40. A bicycle operating system comprising:
a bicycle component;
a first operating device;
a second operating device provided as a separate device from the first operating device; and
a take-up device configured to be mounted to a bicycle body independently of the first operating device and the second operating device, the take-up device being connected to a first end of a control cable, a second end of the control cable being fixedly connected to the bicycle component, the take-up device being operatively coupled to the first operating device via a first control element so as to move the control cable in a first direction in response to a first operation of the first operating device, the take-up device being operatively coupled to the second operating device via a second control element so as to move the control cable in a second direction different from the first direction in response to a second operation of the second operating device, the first control element comprising one of a first mechanical control cable, a first signal communication path and a first liquid, the second control element comprising one of a second mechanical control cable, a second signal communication path and a second liquid, wherein the bicycle component includes:
a base member configured to be mounted to the bicycle body;
a movable member configured to move with respect to the base member; and
a link member movably coupling the movable member to the base member, and the second end of the control cable is fixedly connected to the link member.

41. A bicycle operating system comprising:
a first operating device; and
a take-up device configured to be provided in a tubular part of a bicycle body, the take-up device being configured to move a control cable configured to be connected to a bicycle component, the take-up device being operatively coupled to the first operating device via a first control element, the take-up device is configured to be provided in a stem of the tubular part that couples a handlebar to a steering column, the stem including:
a first attachment portion configured to be attached to the handlebar; and
a second attachment portion configured to be attached to the steering column, and the take-up device configured to be provided between the first attachment portion and the second attachment portion.

42. A bicycle operating system comprising:
a first operating device; and
a take-up device including a take-up member provided in a tubular part of a bicycle body to be rotatable relative to the tubular part of the bicycle body, the take-up device being operatively coupled to the first operating device to move a control cable in response to a first operation of the first operating device, the first operating device and the take-up device being mounted to the bicycle body independently of each other.

* * * * *